(12) United States Patent
Zeier et al.

(10) Patent No.: US 10,008,873 B2
(45) Date of Patent: Jun. 26, 2018

(54) HIGH FREQUENCY MULTIPHASE FLYBACK POWER SUPPLY

(71) Applicants: Bruce Eric Zeier, Romoland, CA (US); Steve M. Hankins, Escondido, CA (US); James A. Mettler, Idyllwild, CA (US)

(72) Inventors: Bruce Eric Zeier, Romoland, CA (US); Steve M. Hankins, Escondido, CA (US); James A. Mettler, Idyllwild, CA (US)

( * ) Notice: Subject to any disclaimer, the term of this patent is extended or adjusted under 35 U.S.C. 154(b) by 320 days.

(21) Appl. No.: 15/066,996

(22) Filed: Mar. 10, 2016

(65) Prior Publication Data

US 2016/0268841 A1  Sep. 15, 2016

Related U.S. Application Data

(63) Continuation-in-part of application No. 13/926,562, filed on Jun. 21, 2013, now Pat. No. 9,166,435, which is a continuation of application No. 12/590,466, filed on Nov. 9, 2009, now Pat. No. 8,330,428.

(60) Provisional application No. 62/131,112, filed on Mar. 10, 2015, provisional application No. 61/663,746, filed on Jun. 25, 2012, provisional application No. 61/114,051, filed on Nov. 12, 2008.

(51) Int. Cl.
| | |
|---|---|
| *H02J 15/00* | (2006.01) |
| *G05B 13/02* | (2006.01) |
| *H02J 7/02* | (2016.01) |
| *H02J 7/10* | (2006.01) |

(52) U.S. Cl.
CPC ......... *H02J 7/022* (2013.01); *H02J 2007/105* (2013.01); *Y02B 40/90* (2013.01)

(58) Field of Classification Search
CPC ...... H02J 7/002; H02J 2007/105; Y02B 40/90
See application file for complete search history.

(56) References Cited

U.S. PATENT DOCUMENTS

| | | | |
|---|---|---|---|
| 4,079,443 | A | 3/1978 | Udvardi-Lakos et al. |
| 5,648,714 | A | 7/1997 | Eryou et al. |
| 5,677,612 | A | 10/1997 | Campagnuolo et al. |
| 5,891,590 | A | 4/1999 | King |
| 6,184,650 | B1 | 2/2001 | Gelbman |
| 6,414,465 | B1 | 7/2002 | Banks et al. |
| 6,556,019 | B2 | 4/2003 | Bertness |
| 6,586,850 | B1 | 7/2003 | Powers |

(Continued)

*Primary Examiner* — Seahvosh Nikmanesh
(74) *Attorney, Agent, or Firm* — Kirk A. Buhler; Buhler & Associates

(57) ABSTRACT

Improvements in a high frequency multiphase flyback power supply for battery charging and power supplies used in devices that provide de-sulfation capability to the batteries. The system utilizes a high efficiency, multiphase array flyback battery charger or power supply, with a localized or Internet based bi-directional communication means to monitor and optimize battery charging. The de-sulfating current can be a variable, or harmonic, repeating patterns of ON and OFF pulses which may be applied to the battery at an operator-adjustable peak amperage of about 0-350 amps. The de-sulfation process before, during or after the normal battery charging cycle, or any combination thereof. The temperature of the battery and the specific gravity of the fluid within the battery is measure during the de-sulfating process. The connection to the internet allows the processes to be monitored at a distance from where the charging is taking place.

20 Claims, 10 Drawing Sheets

(56) References Cited

U.S. PATENT DOCUMENTS

| | | |
|---|---|---|
| 6,586,913 B2 | 7/2003 | Rolfes |
| 6,822,425 B2 | 11/2004 | Krieger et al. |
| 6,975,071 B2 | 12/2005 | Tsai |
| 7,145,266 B2 | 12/2006 | Lynch et al. |
| 2008/0143299 A1 | 6/2008 | Altman |
| 2008/0169819 A1 | 7/2008 | Ishii |
| 2008/0185996 A1 | 8/2008 | Krieger et al. |
| 2008/0247199 A1 | 10/2008 | Djenguerian et al. |
| 2008/0289602 A1 | 11/2008 | Haug et al. |
| 2010/0127666 A1 | 5/2010 | Ball |
| 2011/0248835 A1 | 10/2011 | Speegle et al. |

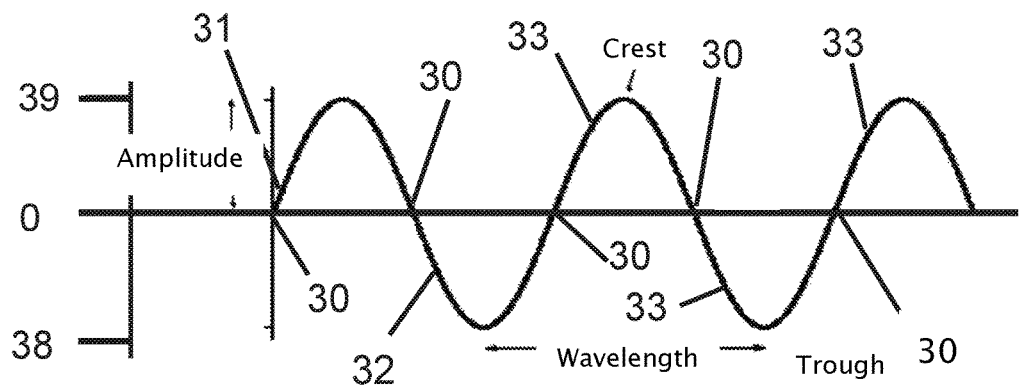
FIG.4.1
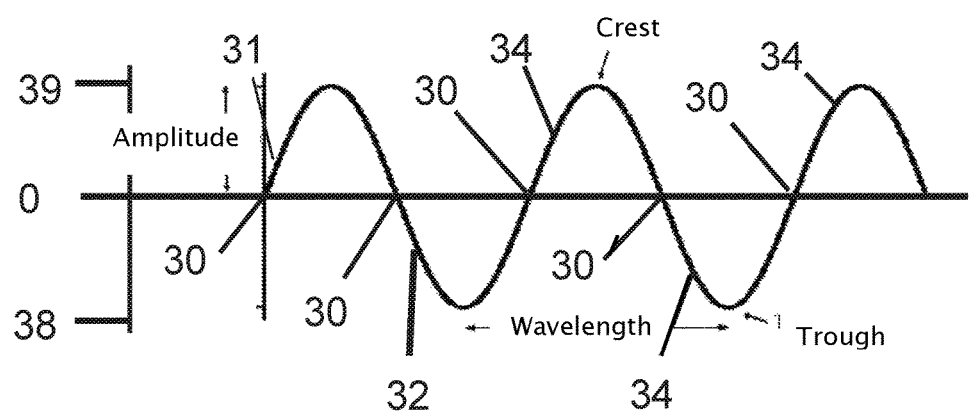
FIG. 4.2

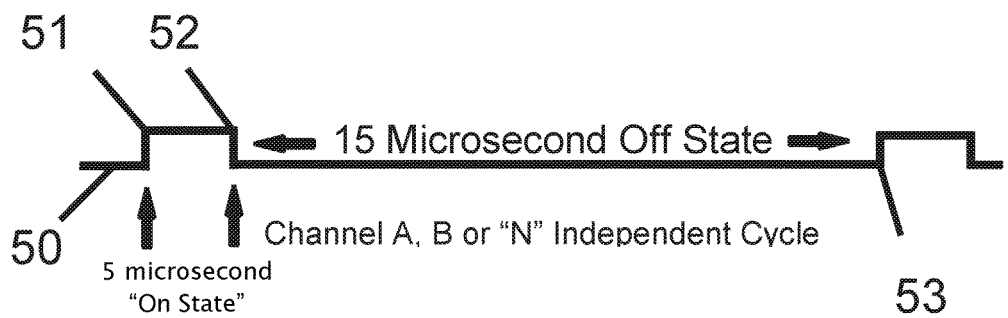
FIG. 5.1
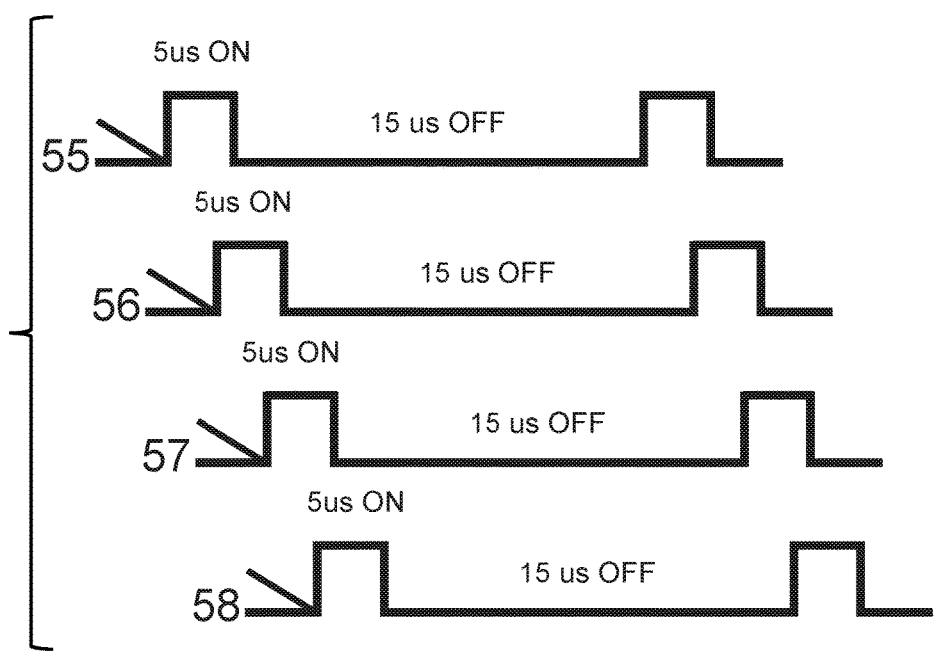
FIG. 5.2

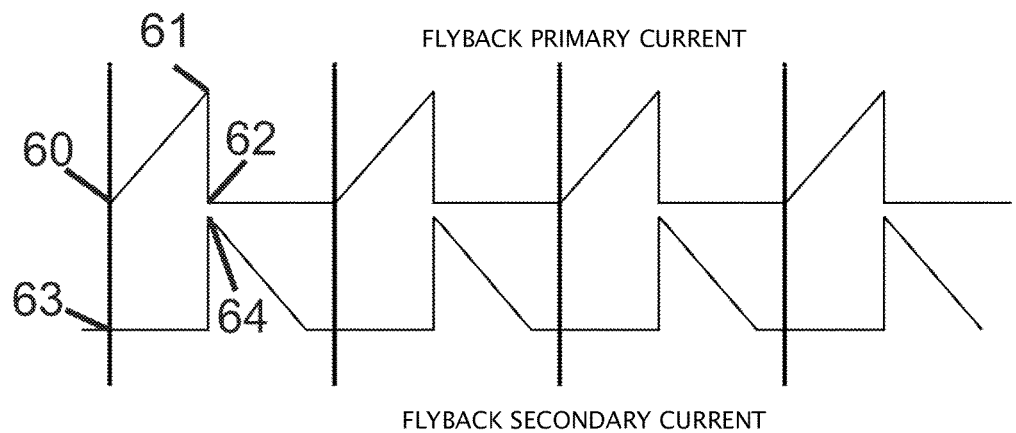
FIG. 6.1
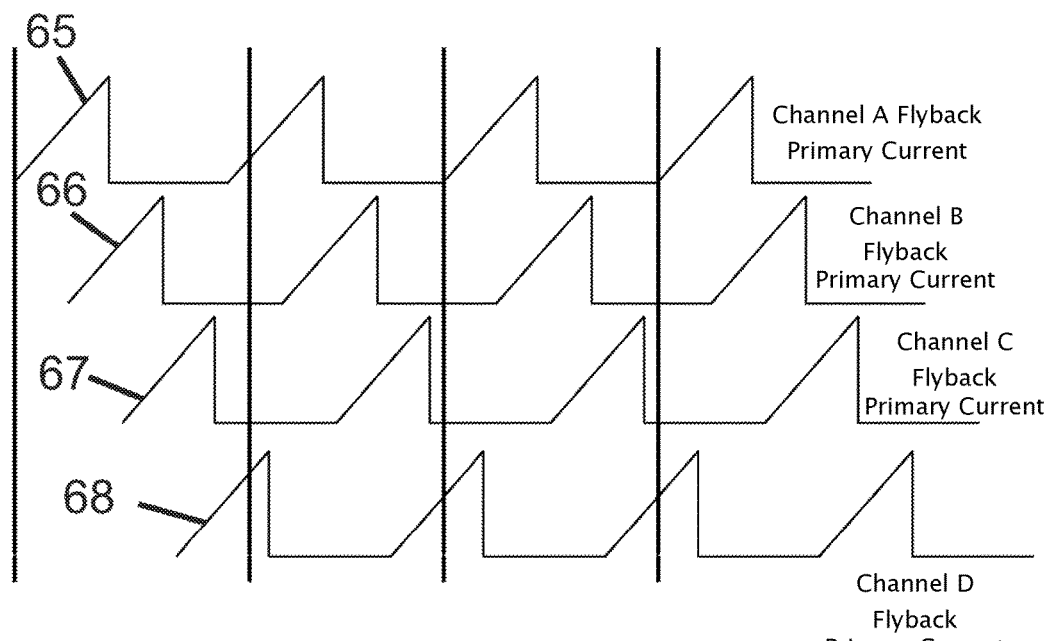
FIG. 6.2

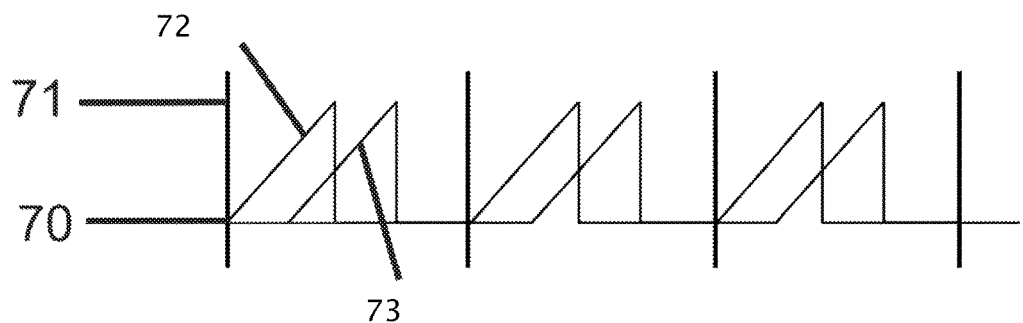
FIG. 7.1
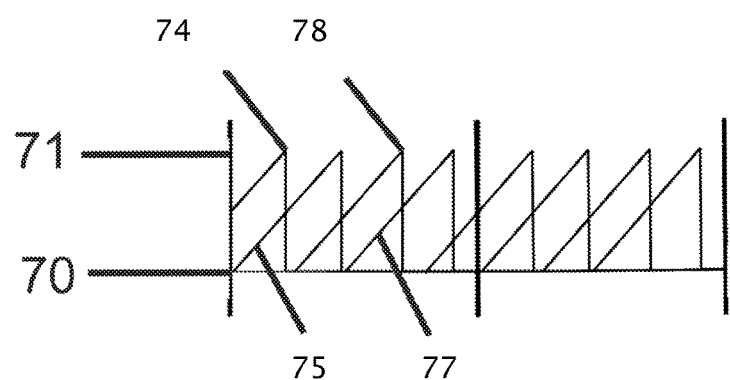
FIG. 7.2

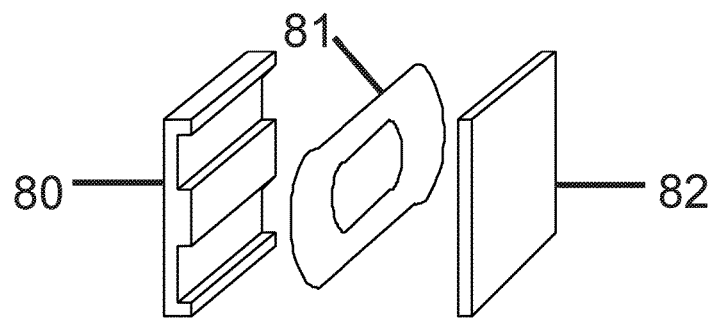
FIG. 8.1
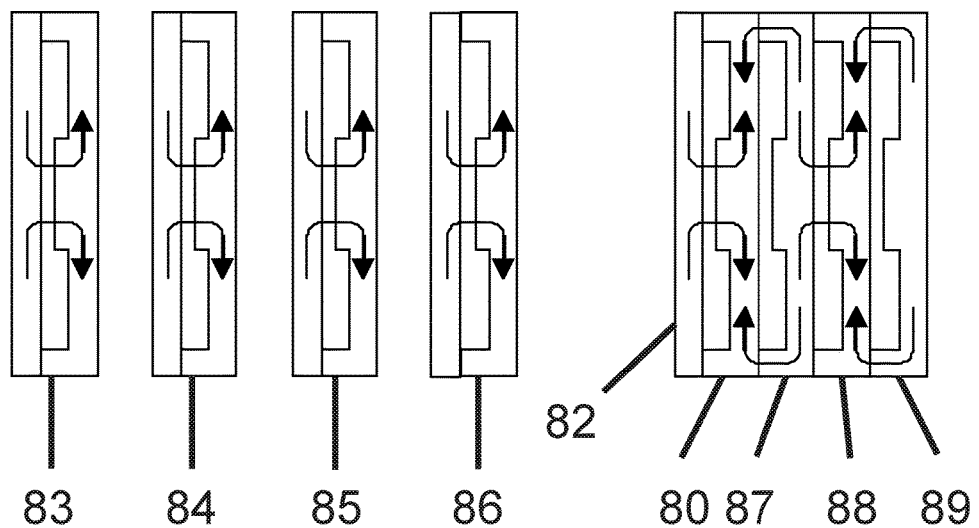
FIG. 8.2         FIG 8.3

| Charge Cycle | Input Current to Capacitor | Battery Voltage | Battery Peak Amps |
|---|---|---|---|
| 1 | 200 ma | 12.5 V | 0 |
| 2 | 400ma | 12.5V | 0 |
| 3 | 600 ma | 12.5V | 0 |
| 4 | 800ma | 12.5V | 0 |
| 5 | 1 amp | 12.6V | 30 |
| 6 | 1.2 amp | 12.7V | 60 |
| 7 | 1.4 amp | 12.8V | 90 |
| 8 | 1.6 amp | 12.9V | 120 |
| 9 | 1.5 amp | 12.85V | 110 |
| 10 | 1.45 amp | 12.825V | 100 |
| 11 | 1.45 amp | 12.825V | 100 |
| 12 | 1.45 amp | 12.825V | 100 |

FIG. 9

| Charge Cycle | Battery Impedance in mili-ohms from Sulfation | Input Current to Capacitor | Battery Voltage | Battery Peak Amps |
|---|---|---|---|---|
| 1 | 10 | 1.45 amp | 12.8V | 100 |
| 2 | 10 | 1.45 amp | 12.8V | 100 |
| 3 | 9 | 1.45 amp | 12.9V | 110 |
| 4 | 9 | 1.25 amp | 12.85V | 90 |
| 5 | 9 | 1.35 amp | 12.9V | 100 |
| 6 | 9 | 1.35 amp | 12.9V | 100 |
| 7 | 9 | 1.35 amp | 12.9V | 100 |
| 8 | 8 | 1.35amp | 13.0V | 110 |
| 9 | 8 | 1.15 amp | 12.95V | 90 |
| 10 | 8 | 1.25 amp | 13.0V | 100 |
| 11 | 8 | 1.25 amp | 13.0V | 100 |
| 12 | 7 | 1.25 amp | 13.1V | 100 |

FIG. 10

HIGH FREQUENCY MULTIPHASE FLYBACK POWER SUPPLY

CROSS REFERENCE TO RELATED APPLICATION

This application claims the benefit of Provisional application 62/131,112 filed Mar. 10, 2015 which is a continuation-in-part to Non-Provisional application Ser. No. 13/923,562 that was filed Jun. 21, 2013 that issued as U.S. Pat. No. 9,166,435 on Oct. 20, 2015 that claims the benefit of Provisional Application 61/663,746 filed on Jun. 25, 2012 that is a continuation-in-part of application Ser. No. 12/590,466 that was filed on Nov. 9, 2009 and issued as U.S. Pat. No. 8,330,428 on Dec. 11, 2012 that claims the benefit of Provisional Application 61/114,051 that was filed on Nov. 12, 2008 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to the Industrial Battery Field. Specifically, battery charging and power supplies used in devices that provide de-sulfation capability to the batteries.

Description of Related Art Including Information Disclosed under 37 CFR 1.97 and 1.98:

Prior art does not allow for the real-time measurement of battery or cell metrics, and the resultant modification of the charger or de-sulfation device power supply outputs, based in whole or in part by the analysis of those battery or battery cell metrics, to attain a desirous value between a target value and the power supply output's measured effect upon a battery or device.

Prior art does not allow for the real-time power supply conversion of AC Mains phases and frequencies, in a multi-channel phased array design.

Prior art does not allow for the modified "stacked" placement of "planar" transformers, in a manner that minimizes transformer core losses.

Prior art does not allow for the bi-directional wireless command and control of the power supply functions, using an internet based system, a WIFI system, or a telemetry based communications means such as GPRS with the cellular phone network.

Prior art does not allow for the measurement and processing of battery or battery cell electrolyte specific gravity data values, then adjusting the output characteristics of the power supply to obtain a targeted specific gravity.

Prior art does not allow for the measurement and processing of battery or battery cell electrolyte temperature data values, then adjusting the output characteristics of the power supply to compensate for electrolyte temperature.

Prior art does not allow for the variability of the output voltage at high current levels required for some dedicated devices, or to function as a universal, high current battery charger.

It is a well-known and often used for effectively filtering the switching transients using inductors and capacitors in various topologies that remove these transients. It is also well known that the size and cost of these inductive and capacitive components increases inversely with the frequency that it is designed filter out. i.e. the lower the switching frequency of the power supply, the larger the filter components, and the more they cost. So it is desirable to increase the switching frequency of the power supply to reduce the cost. However technological limits on other power supply components do not permit the frequency to be arbitrary increased just to reduce the cost of the input filters.

What is needed is a high frequency multiphase flyback power supply that monitors batteries as they are being charged. The information provided in this disclosure provides the solution.

BRIEF SUMMARY OF THE INVENTION

Battery charger power supplies convert AC Mains source current and voltage into a DC Load Current for charging a battery. The power conversion means may be a linear device such as a power supply using individual or multiple transformers that regulate the output voltage by continually dissipating power in the "pass through" transistor. An alternative is a switching power supply that continually switches the AC Mains power from the full-On State, to the Full-Off State, with little time spent during the transition to minimize energy loss.

A power supply may be used within the Battery Industry as a battery charger, or as a means by which to charge an energy storage means, such as a capacitor used in the BattRecon Brand of de-sulfation devices. The Multiphase Flyback Power Supply, (MFPS) disclosed herein, may also have non-battery industry applications. The MFPS may also be used as an applied solid state, isolated, phase converting, frequency converting, flyback reduction or eliminating, variable power supply, as a replacement for what is commonly referred to as a Variac.

Linear Battery Charger Power Supplies may use one or more isolation power transformer(s) to electrically isolate the battery charger output from the AC Mains power source, and convert the AC power into DC power. When used in a high current, low frequency output application, a single or low frequency switched ON/OFF pulse during the AC sine wave may result in an adverse flyback voltage onto the AC Mains, as the current draw is released. The resultant phase shift between the AC Voltage sine wave and the Current sine wave may increase the Power Factor inefficiency.

The present disclosure contemplates that some magnetic isolation transformers, or other switching power supplies, used in a high current-low frequency application, may be substituted with a High Frequency—Power Factor Corrected—Multiphase Flyback, Switching Isolation Transformer Array power supply, the MFPS.

The MFPS may have the advantage of being lighter than a linear purely magnetic isolation means, and may be less expensive to build than a purely magnetic isolation means.

The MFPS also has favorable power factor characteristics, which may lower the electrical operating cost when compared to a linear power supply, or a less efficient switching power supply.

The power conversion means may also be a switching power supply that converts and isolates the AC Mains power using a switching regulation means to continuously turn on and off the AC Mains, using a low-dissipation, full-on and full-off cycle methodology. The high frequency switching power supply minimizes high dissipation transitions between the full on and full off cycle, which will minimize wasted energy. Ideally, a switching power supply dissipates no power during the switching means.

The presently available switching power supplies may suffer the adverse effects of generating electrical noise, inducing high flyback voltages, the failure to have enough range of voltage variability at high current demands when powering dedicated devices such as the BattRecon brand of battery de-sulfation devices, may be damaged when the outputs are short circuited, and they providing energy at a poor power factor. The present disclosure provides an increased efficiency, high frequency switching power supply means, incorporating a highly efficient transformer/magnetics design, a wide range of voltage variability at a high current flow, an internal or external control means using a wired or wireless communication means, a processor that may adjust the operational output of the MFPS based upon computer processed metrics provided by external probes or sensors, a software algorithm that may be used to operate the MFPS at the most optimum Power Factor, and a software algorithm that may predict battery, or device, life expectancy or serviceability.

The present disclosure applies to a battery charger, or alternate device, power supply design that provides for a "Sequentially Switched, High Frequency, Multi-Phased Flyback, Isolated, transformer Array Design." The MFPS consists of a Computer Processor Control means, computer software, a wired or wireless connection and communication means between the processor and individual power channels, a wired or wireless connection and communication means between the processor and an external device that provides external sensor or probe captured battery, device or environmental metrics, a wired or wireless connection and communication means between the processor and an external dedicated command and control device, one or more individual power channels consisting of proprietary flyback transformer channels, and more than one power transformer circuit referred to as a Power Channel.

An exemplary MFPS using a Flyback" transformer design, may have inherent short circuit protection since the flyback transformer is an energy limited device, unlike other transformer designs. The MFPS system used as a battery charger, may encounter a battery with an internal short circuit. The energy limited design of the disclosed MFPS prevents the power supply circuit from excess current that would normally occur when the power supply outputs are shorted.

An exemplary MFPS has a wide range of voltage variability under large current loads, to power devices such as the BattRecon Battery De-sulfation systems. As an example, when working with an 80-volt battery bank, the BattRecon system may require upwards of 110 volts DC, at 250 peak amps, during an approximate 20% duty cycle. The same BattRecon System may also be applied to a 12-volt battery that requires upwards of 30 volts DC at 140 Peak Amps with a 20% duty cycle. Therefore, the dedicated BattRecon application of the MFPS would require a high current output varying from 0 to 250 Peak Amps between 10 to 120 VDC.

Contemporary switching battery charger power supply designs are unable to withstand the wide voltage range and high current demands of some dedicated devices. This variability and high current capability would allow the MFPS to be incorporated within a "Universal Battery Charger," that provides charging output that ranges from 0 to 120 VDV when using a 120 VAC AC Mains circuit, or 0-240 VDC when using a 240 VAC AC Mains circuit.

The exemplary MFPS bi-directionally communicates with external devices, such as the BattRecon Branded Digital Specific Gravity Probe. The specific gravity probe is immersed within the battery or battery cell electrolyte and provides real time data to the MFPS, or the MFPS control means. Data such as digitized electrolyte specific gravity, electrolyte temperature, impedance and other battery metrics may be processed and used as modification parameters for control of the MFPS.

Modified Transformer Design: The transformer array may consist of individually controlled and switched, sequentially phased, individual "Planar E and I" type transformers featuring a unique "face to back" configuration, and the omission of several "I" plates from the array.

It is widely viewed that Planar transformers are limited to low power output, typically less than 250 watts, because of their multi-sequential winding layers and other factors. This disclosure, however, teaches how a specially configured array positioning of individual planar transformers may reduce flux density and increase transformer performance.

Alternatively, individual toroidal transformers, or other transformer types known within the industry, may be substituted.

In an exemplary MFPS, the phased array transformer design may consist of a modified "Planar E and I Constructed," stack-up of individual transformer "Channels." The Planar Transformer consists of an "E" and "I" formed plate, and a coil assembly that may consist of: 1) a flat coil winding, 2) a printed circuit board with an etched series of spiral traces, or 3) an equivalent coil assembly design.

The modification consists of the initial placement of a contemporarily assembled, Channel "A" positioned, Planar transformer. Subsequent transformer channels "B, C, D" or "N" Channels, would be assembled omitting the "I" plate within the individual sub-assemblies. Once the "I" plate is omitted on the second channel transformer, the second channel "E" "face" would be positioned in close proximity to, or perhaps actually touching, the "back" of the first channel "E" plate. The coil winding or PCB plate would then fit between the "E" shaped forms.

Subsequent individual channels would have the "I" plate removed and their corresponding "E" plates "face," positioned in close proximity to, or perhaps actually touching, the "back" of the preceding transformer. The coil winding or PCB plate would then fit between the "E" shaped forms.

The individual legs of the "E" plates may touch the "I" plate, or adjacent "E" plate "backs." Fine tuning of the exemplary MFPS transformer "E" plates may allow that the center leg be shortened creating a gap between the center leg and the "I" plate. This gap may be varied as an adjustment means of the inductance value of the transformer, or transformer array, thus altering the output current range. Other adjustment combinations may be made by allowing the center "E" leg to remain in contact with the "I" plate, or successive "E" plate "backside surfaces," but then shortening the upper and lower "E" plate legs changing the output current of the transformer. Other combinations are available depending upon the desired output and the material used during the transformer construction.

The elimination of core material mass reduces the core losses, therefore, removal of "I" plate segments would lower the mass of the core, reducing the core losses and increasing the efficiency of the transformer and power supply.

Design Topologies

The MFPS has at least two functional topologies, 1) as a switching AC to DC power supply only, or 2) as a "Power Pack," which combines the AC to DC switching power supply with an additional and separate, energy storage and discharging means.

The power supply version converts AC Mains energy into a switching output, DC power supply, featuring more than one individual "Flyback" transformers operated in a Multi-channel Phased Array. The transformer array may consist of individually controlled and switched, sequentially phased, individual "Planar E and I" type transformers featuring a unique "back to back" configuration, or individual toroidal transformers, or other transformer types known within the industry. The switched energy output is delivered directly to the output load, such as a battery or other power consumptive device.

The "Power Pack" methodology combines the switching power supply features with an energy storage means such as a capacitor, a battery, or other storage means; the final discharge of which is controlled by a separate logic gate and power switching means. The "Power Pack" stores the switching power supply output, then independently discharges the stored energy into a load. The load may be a battery, such as when the device operates as a battery de-sulfation system, or as a pulsed battery charger, as examples. The load may also be a non-battery device, in which case the "Power Pack" is operating as a high efficiency power supply.

The output of the "Power Pack" may be controlled by the power supply controller, or an external wired or wireless means, in either a "Measured," or a "Timing" methodology. This output channel may have a different operational frequency than the power supply.

Regardless of whether a Measured or Timed output topology is used, the power supply's phased, switched array will sequentially connect and disconnect the AC Mains to each individual Phased Flyback Transformer Channel during a sine wave current flow, evenly distributing the average current requirement between the individual transformer channels. The sequential switching means may be a "rotating ring" design circuit, commonly known in the electronics industry, or another sequential switching means, controlled in a constant or variable manner by a computer processor and software. The computer means may also "skip" power sine waves from being coupled to an individual transformer switching channels, depending upon power output requirements. The computer may limit the "On State" to allow more complete discharging during the "Off State".

As an example a 50K Hz switching frequency is assumed, with 4 channels, Channel A, B, C, and D. In a 50K Hz switching operation, each channel will be in a conductive state for 1/50,000=0.00002 seconds, (20 microseconds–20 us) therefore, each individual channel will sequentially conduct both charge and discharge current during the 20 us period. The "Conductive State," is therefore the sum of the time duration of both charging and discharging functions.

The charging condition is referred to as the "On State," while the discharging (or power off) state is referred to as the "Off State." The "On State" is varied in duration by the controlling processor and software, varying the "On State" may automatically vary the "Off State." The "Off State" in some applications may be managed to ensure the discharge state allows the load (consumptive device(s) or storage capacitor) to lower the inductive energy levels within the flyback transformer to prevent magnetic saturation.

The failure to prevent magnetic saturation may result in a "stack-up" condition, which may result in the inductor becoming a "conduction means," which may then over-load the power supply design capabilities. In the event the "Off State" must be managed, this may require the processor and software to reduce the maximum "On State" timing, thereby allocating more of the 20 us time duration to completing a discharge cycle.

Each input power sine wave may have more than one discrete power channel that is coupled to it at any given time. As Channel A, as an example, is connected to the power sine wave charging the primary side of the flyback transformer, a time interval begins that is determined by the frequency of the switching controller. The processor then determines when the next sequential channel, Channel B, begins its interval, then Channel C, then Channel D. Once this sequence is completed, then the computer begins the sequence again with Channel A, then B, then C, and Channel D. The "On State" timing sequence continues during the operation of the power supply. The "On State" point of inception for a charge mode for individual channels may, or may not, overlap preceding channel "On State" inception points.

As an example of channel charge mode overlap, Channel A may begin the sequential cycle closing into a charging mode for 5 us, then switch into a discharge mode for the remaining 15 us of the Channel A allotted operational time. The computer may then direct Channel B to close at the relative 4 us point of Channel A along the sine wave, going into the charging mode at the same time as Channel A is concluding its charge mode. In this example, Channel A and B are simultaneously in the charging conductive mode for 1 us along the power sine wave.

As an example of channel charge modes which do not overlap, Channel A may have begun the sequential cycle closing into a charging mode for 5 us, then switch into a discharge mode for the remaining 15 us of the Channel A allotted operational time. The computer may then direct Channel B to close at the relative 10 us point of Channel A, along the sine wave, going into the charging mode at a time during the Channel A discharging mode. In this example, Channel A and B are not simultaneously in the charging conductive mode.

As an example of managing "Off State," let's compare the charging of a 12V battery at 1 amp, to that of an 80V battery at one amp. The charge will be dissipated faster into the 80V battery than the 12V battery. Therefore, the "Off State" duration may be much shorter in the 80V battery than the 12V battery. The 12V battery's discharge time would have to be longer to fully remove the stored energy from the transformer secondary, or the energy stored in the capacitor, other than the 80V battery.

Channel Description

Each output channel or phase would consist of: 1) a power switching device, (such as an IGBT, MOSFET, or other switching means), 2) a special "Flyback Transformer," 3) a rectifier that may act as a reverse current diode, 4) a current/voltage measuring means, and 5) a fuse or other circuit protection means. In the event the MFPS is used in a dedicated application such as the BattRecon brand of de-sulfation devices, there may be an additional power switching device located between all phases of the power supply, and/or the storage capacitor, and the battery or other load device.

The AC Mains power supply is full wave rectified into a DC power current. This current is applied to a power distribution buss, to which each individual channel is connected. The channel switch, such as an IGBT, MOSFET, or other power switching means, closes to connect the DC Power buss to the primary windings of the flyback transformer. The energy is stored in the transformer's magnetics until the channel switch is opened. The opening of the switch interrupts the DC Power Distribution connection to the transformer, at which time the energy is discharged from the transformer secondary windings through the (reverse current) rectifier, past a current and voltage sensing device, through a fuse or circuit protective device; and onto the battery, the storage capacitor or other load device. The transformer's secondary output rectifier, which may act as a reverse current diode, contains the inductive secondary flyback caused by the discharge between (within) the load side of the Channel power supply, and the load, preventing it from "flying back" into the transformer magnetics.

The number of independent transformer phases is referred to as "N"" phases, which refers to any quantity of individual phases greater than 1.

The "N" phased design is scalable by the increasing or decreasing the number of Phased Array Channels. As an example, if a load demand was 1000 watts, and the individual phased channels were designed for 100 watts of output, then 10 individual parallel channels would be configured in the Phased Array providing the desired 1000 watts of output.

The MFPS may also provide benefits by reducing conducted and radiated emissions during operation. As the phase count repetition of a "frequency" increases, then EMI emissions both conducted and radiated, are lowered. Using smaller transformers in a Multiphase Array may reduce the cost of AC Mains isolation.

The MFPS does not provide a true constant voltage or current output. The output power is therefore, considered metered and may vary depending upon the demand requirements of the powered device (load). A large capacitor in parallel with the output conductive means may significantly reduce output ripple.

The MFPS may be operated as a battery charger or device power supply (a "non-dedicated" system), or may act as an integral power supply for a "dedicated device" such as the BattRecon Brand of battery de-sulfation systems. When used as a "dedicated device," hardware or software changes may be made to the system to accommodate the device requirements.

As an example, when dedicated as the power supply for the BattRecon brand of de-sulfation systems, the output current is stored within an external capacitor. An additional IGBT, or equivalent power switching device, may then be positioned between the storage capacitor and the battery. The processor and software would be programmed to control the timing and duration of the capacitor discharge into the battery.

All phases would have variable "ON TIME" status, with 360 degree interleaved phasing. The "ON Time," could be controlled by a processor, which measures and compares voltage or current metrics, or by a modification to the channel control timing that would result in variance in the output voltage or current. The Variable "ON Time" is defined as the amount of time the individual channel switching means, IGBT, Transistor, or other switching device, is closed allowing AC Mains current to pass into the channel.

The "Off Time" is therefore, that remaining time during the sine wave that the channel current flow is blocked from passing through the switching means, to the individual channel.

An exemplary embodiment of the MFPS would be that all phases would consist of "ON State" timing with 360 degree interleaved phasing. Some embodiments may use a fixed frequency of 48.8 KHz, as an example, while others may be variable. The "OFF Time" (or flyback time) is determined by subtracting the "ON State" time from the cycle period. The Serial Peripheral Interface (SPI Bus) "ON Time" may range between 20 ns and 15.36 ns. All phases may share the same "On Time," and "Off Time" frequency. Ideally, the "On Time" is restricted to $768/1024$ of the cycle duration to mitigate slippage into continuous conduction operation and subsequent transformer core saturation. The "On Time" is controlled by a microprocessor and associated software, and is specified as a 10-bit number via the SPI bus. In a preferred embodiment, the "On Time" may not exceed 13.6 us for a 120 VAC power supply operation, for 240 VAC operation the "On Time" cannot exceed 6.7 us.

"N" independent phase drive enabled flip flops permit degraded operation in the event that a given phase is disabled due to a component failure. If one channel within the array is disabled, then the output of the remaining functional channels may be adjusted by the computer. The adjustment may be to increase power output from the remaining channels, reduce power output from the remaining channels, or terminate the operation of the remaining channels. The SPI bus commands, or other communications enabled protocol commands, independently control the enabling and disabling of each phase by its respective flip flop.

For any given cycle, after the minimum "Off Time" has transpired, the external magnetics reset sense logic input is detected. Immediately upon meeting the conditions of completion of the minimum "Off Time," and detection of the reset sense input, then the processor terminates the operational cycle and a new cycle is begun.

All "N" phases are phased in such a manner that for any "N" phase system, K*360/N phase delay will be provided for phase K, where K ranges from 0 to N-1.

The external over voltage comparator input is a logic— since the "N" rectified outputs are all summed together to store energy, charge a capacitor, or battery, or power a device, then only one overvoltage comparator input is required. This input should be 5-volt tolerant. An overvoltage condition latches all phase flip flops to the off state. Only a SPI bus command, or other command means, may reset (re-enable) these flip flops.

An external over current input for each of the "N" phases is incorporated into the design. These inputs are typically 5-volt tolerant, although other logic voltage may be used. A logic low condition (fault) on any input will result in immediately latching a "disable command" for that phase. This is not a sample input but a latched input. Disabled phases may only be enabled by individual (SPI bus) commands once the fault condition is corrected. A "Power Up" command in conjunction with a sensed "fault condition," will result in all "N" phases remaining in a disabled state. Only commands absent of fault conditions may enable the "N" phases. Each "N" channel may have an Individual LED driver outputs to signal that channel is in the disabled state.

The Processor Controller is implemented in flash programmed CPLD, or other processing means, with at least 100 MHz external clock input. This results in a time resolution of 10 ns on all time registers.

The AC zero crossing point input may be sensed and extracted from the low voltage power supply AC winding and optically isolated external to the controller.

While the use of the Peak Amps, Voltage, Electrolyte Temperature and/or Specific Gravity, or Impedance battery cell metrics are exemplary, it is understood that other battery or battery cell metrics may be substituted for, or used in combination with, the exemplary metrics to control the "On State Charge Cycle Durations," or the dedicated device additional switching means.

Environmental metrics such as temperature, humidity or gaseous concentrations, may be used in conjunction with other battery or device metrics to control the "On State Charge Cycle Durations," or the dedicated device additional switching means. Device Specific Metrics may also be used to control the "On State Charge Cycle Durations".

The MFPS may use external input devices such as probes or sensors to measure and collect battery, or battery cell metrics in real time. Those metrics may be used to modify the operation of the MFPS. As an example, an externally mounted "Digital Specific Gravity Probe" may provide real time battery electrolyte information to the MFPS processor, using a wired or wireless means, which may then modify or control the individual channel "On State" durations, or the "On State" duration of the "dedicated device" switching means, based upon the specific gravity, or the temperature of the battery electrolyte, as examples.

The MFPS may use external communication devices such as wired or wireless means to bi-directionally transmit battery data, or battery metric data, and remote device command and control information. The transmission may be in real time to bi-directionally communicate locally to a computer or computer network server, or may bi-directionally communicate using WIFI or GSP telemetry and Internet based communication from a fixed IP address, via an Internet based protocol, a telemetry based protocol, a Wi-Fi protocol, or other data communication means.

The MFPS may be controlled in whole or in part, using a computer PC or Web-based means, a "Cloud Based" control server and a Graphical User Interface (GUI) control panel. The control panel may be used to measure, monitor or control the MFPS when the MFPS is used as a "Stand alone" device, or the MFPS control means may be integral to a dedicated device GUI. The GUI interface may control such functions as, the On/Off state of the MFPS or device the MFPS is integral too, the MFPS individual channel control switching On/Off state sequence, duration and frequency, the MFPS or dedicated device output metrics such as voltage or current, as examples, and the MFPS separate output switching means On/Off state, frequency, duration and frequency.

A "Re-characterization Diagnostic Cycle" may be required as measured battery or dedicated device metrics are impacted by the MFPS output. As an example, the typical result of charging a battery may be the reduction of the battery's internal resistance. This lowered resistance would alter the measured battery amperage, assuming the same applied voltage from the MFPS. Therefore, to maintain a specific battery metric such as amperage, the MFPS "On State" duration would have to be occasionally modified, or "Re-characterized," when using the Timing Methodology in the Dedicated Device Output Mode. The "Re-Characterization Mode" is continuously used when operating in the Measured Methodology in a Dedicated Device Power Pack.

Operating in BattRecon Mode: A "Fire Command" flip flop drives the fire gate of an external power switching means. The Fire flip flop is automatically set on the zero cross event of each AC cycle if the Batt-Recon enable flip flop mode is activated. Upon power on reset, the Batt-Recon enable flip flop is reset to a disabled state. Only a properly addressed (SPI bus) command can enable the Batt-Recon flip flop. The Fire pulse has programmable pulse width from 0 us to 1311 us with a resolution of 20.5 us (6 bits of control).

External circuitry to the MFPS controller senses the output current pulse amplitude during the "Batt-Recon Mode" and transmits it to the embedded controller. The actual output amplitude's affect upon the load is compared with the desired pulse amplitude, from which corrective commands are issued to the MFPS via its communications (SPI bus) interface. The commands change the on time to either increase or decrease the flyback charge transferred during each 20.48 us MFPS cycle into the charge storage capacitor. At the end of each main's half cycle, the fire switching device (IGBT or other means) is triggered and the charge is transferred into the battery. A PID loop, or the equivalent, may be designed into the processor code to regulate the BattRecon pulse amplitude.

Watchdog timer. A watchdog timer shall be implemented into the MFPS to automatically disable the phase drive output flip flops in the event that communication with the ADUC841 process is lost, or the SPI bus is damaged or disabled.

The present disclosure contemplates the MFPS power supply may extract pulses from the AC mains that are spread throughout the mains sine wave and modulated in such a manner that the current in each pulse is proportionate to the demand needed for energy storage, battery charging, or capacitor charging when used in a battery de-sulfation, battery optimization process peak amplitude.

These power supply pulses would be sufficient in number and frequency to allow each pulse to be converted into individual discharge bursts to the battery during charging, such that the battery charging RMS amperage is achieved.

These power supply pulses would be sufficient in number and frequency to allow each pulse to be converted into individual discharge bursts stored within an energy storage means, or a capacitor during battery optimization processes, such that the full energy demand of the desired battery peak amplitude could be achieved.

The power supply may be controlled and monitored by a local hardware/software device, by wired or wireless means; or may be controlled and monitored by a local hardware/software device remotely located using a network or internet connection.

The remotely controlled device may be connected using a WIFI, Telemetry based cell tower system, the internet, or other wired or wireless means. This remote device may provide communications to and receive communications from the power supply, allowing bi-directional command and control of the power supply from anywhere in the world.

The MFPS may be controlled by factors other than battery metrics, such as ambient temperature, AC Mains voltage and current characteristic, time, humidity, etc.

The amount of energy carried by each power supply pulse would be small enough to minimize the components and their energy storage requirements to economize the design. The MFPS device Power Factor may be defined by the controlled and constant ratio of the voltage to the current demand on the mains, and considered near unity by design to about 97%.

The scalability derived by phasing of the flyback elements. By scalability, the scale of a power supply or battery charger is almost arbitrarily increasing with the number of primitive flyback elements that are added. This is made possible by staggering the timing of the primitive elements in a sliding timeline. A switching power supply, operates at a high frequency. The period, or duration, of each cycle of this switching frequency is divided by the number of primitive flyback elements in the scaled up design. For example, in a transformer assembled with 16 primitive flyback elements there would be a gain 16 times greater power output capability. This is accomplished by phasing each of the 16 elements by $\frac{1}{16}$th of the period of the switching frequency. Each element would be 360 degrees divided by 16 or 22.5 degrees phase shifted from its adjacent neighboring primitive elements. The following a few of the advantages of this idea:

If a circuit failure is detected within any given primitive element, that element may be taken offline, yielding a graceful degradation in power output as failure take individual elements offline.

Switching power supply technology always must deal with the filtering of transients from escaping into adjacent users attached to the power supply mains. The quality of products is maintained by sometimes rigid international standards maintained throughout the world that limit the amount of emissions into the mains power lines. With the phased primitive power supply elements disclosed in this invention are assembled they have the property of simulating ever-higher frequency switching by virtue of the phasing of the elements. So, for example, a power supply with an operating frequency of 50 KHz would have a switching period of 1/50E3 or 20 microseconds. However if 16 primitive elements were phased at 22.5 degrees it would appear to have a switching frequency of 1/(20e–6*16) or 800 KHz. One gets the advantages of filtering at 800 KHz while using components that are only operating at 50 KHz.

The advantage of the filtering of transients from the input mains filter also applies to the output filter of the power supply. The higher effective phased output transient frequency may also be filtered by smaller and cheaper components which also serves to reduce the cost of the power supply or battery charger.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 4.1 and FIG. 4.2 are illustrations of the switching to AC Mains synchronous sine wave process.

FIG. 5.1 and FIG. 5.2 are illustrations of the "On State to Off State" timing process.

FIG. 6.1 and FIG. 6.2 is an illustration of the Primary and Secondary Flyback energy.

FIGS. 7.1 and 7.2 are illustrations of the superimposed flyback current waveforms.

FIG. 8.1, FIG. 8.2, and FIG. 8.3 are illustrations of the modified Planar E and I constructed Transformer.

FIG. 9 is a data chart example of the "Characterization Diagnostics" process.

FIG. 10 is a data chart example of the "Continuous or Re-Characterization Cycle".

DETAILED DESCRIPTION OF THE INVENTION

Figure 1:
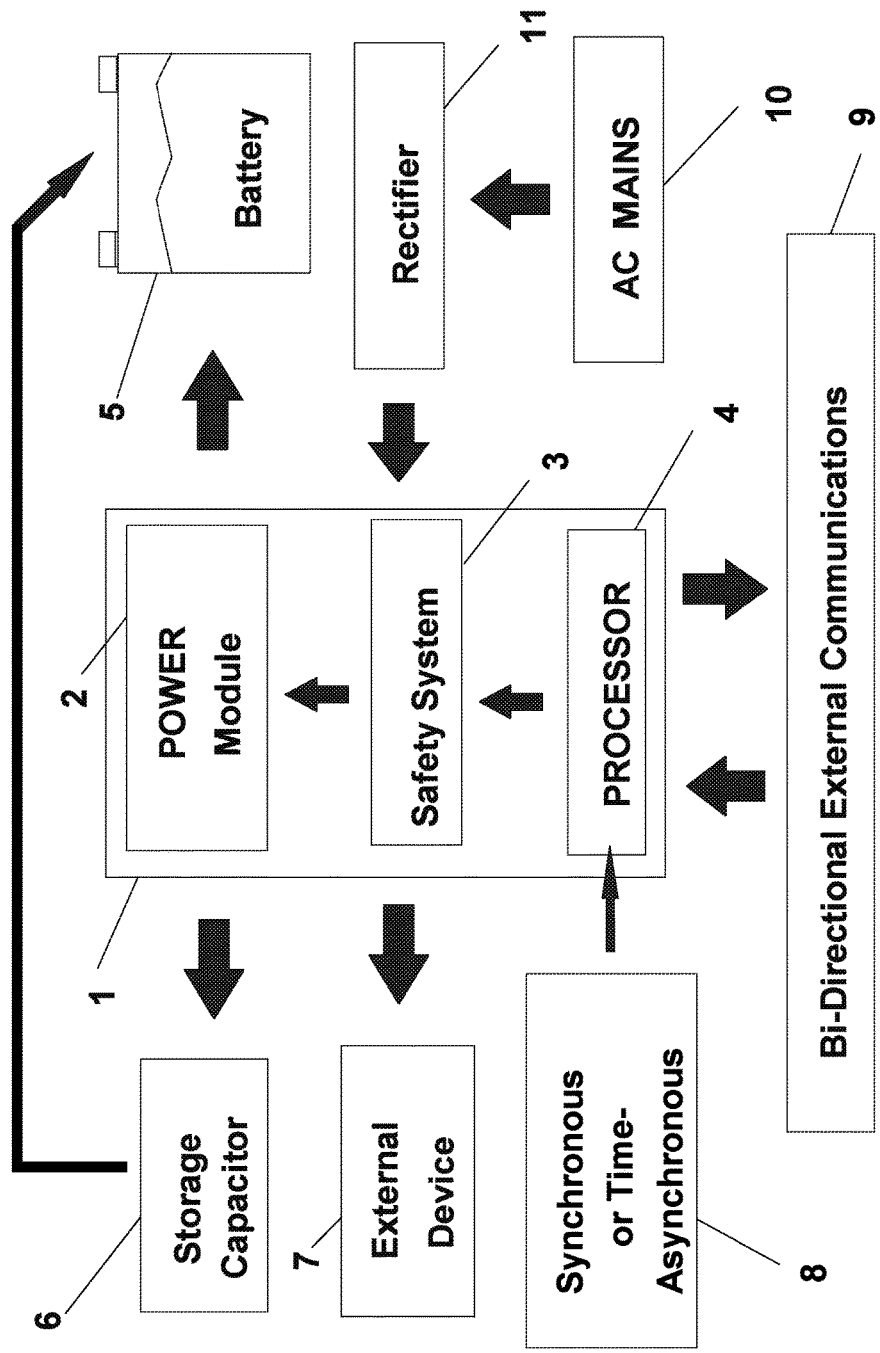
FIG. 1 is a block diagram of the Multiphase Flyback Power Supply.

FIG. 1 is a block diagram of the Multiphase Flyback Power Supply. In the following High Frequency, Multiphase Flyback Power Supply 1 system description there are three basic elements, the processor and software control means or processor 4, the safety interrupt system 3, and the Power Module 2 consisting of multiple isolation power distribution channels.

The Processor 4 reads and acts upon software driven commands and parameters to control the power supply's Power Module 2, which consists of one or more phased power channels, and may have an additional "Device Output Switching Means" to separately control the output of the power supply energy storage means, to an external device. The power board channels carry the high currents necessary to universally charge a battery, a storage capacitor, an energy storage means, or power another device. In the event of a system over current, over-voltage condition, or other fault, the safety system 3 disables individual phased power channels, or all the power channels.

AC Mains power 10 is full wave rectified by rectifier 11 into a Direct Current, often referred to as "Dirty DC," which is then provided along a DC Power buss within the power supply chassis 1. The power buss then connects and provides a conductive means to each individual power channel. Each individual power channel will provide output current to a battery 5, a storage capacitor 6, either independently or in parallel with a battery 5, or an external device 7. The system processor 4 may send/receive bi-directional commands or data 9, signal on/off commands, frequency adjust commands, On/Off State duration commands, or other commands relating to the operation of the Phased Power Channels, using either a wired or wireless means, locally from a network, or internet based system.

Figure 2:
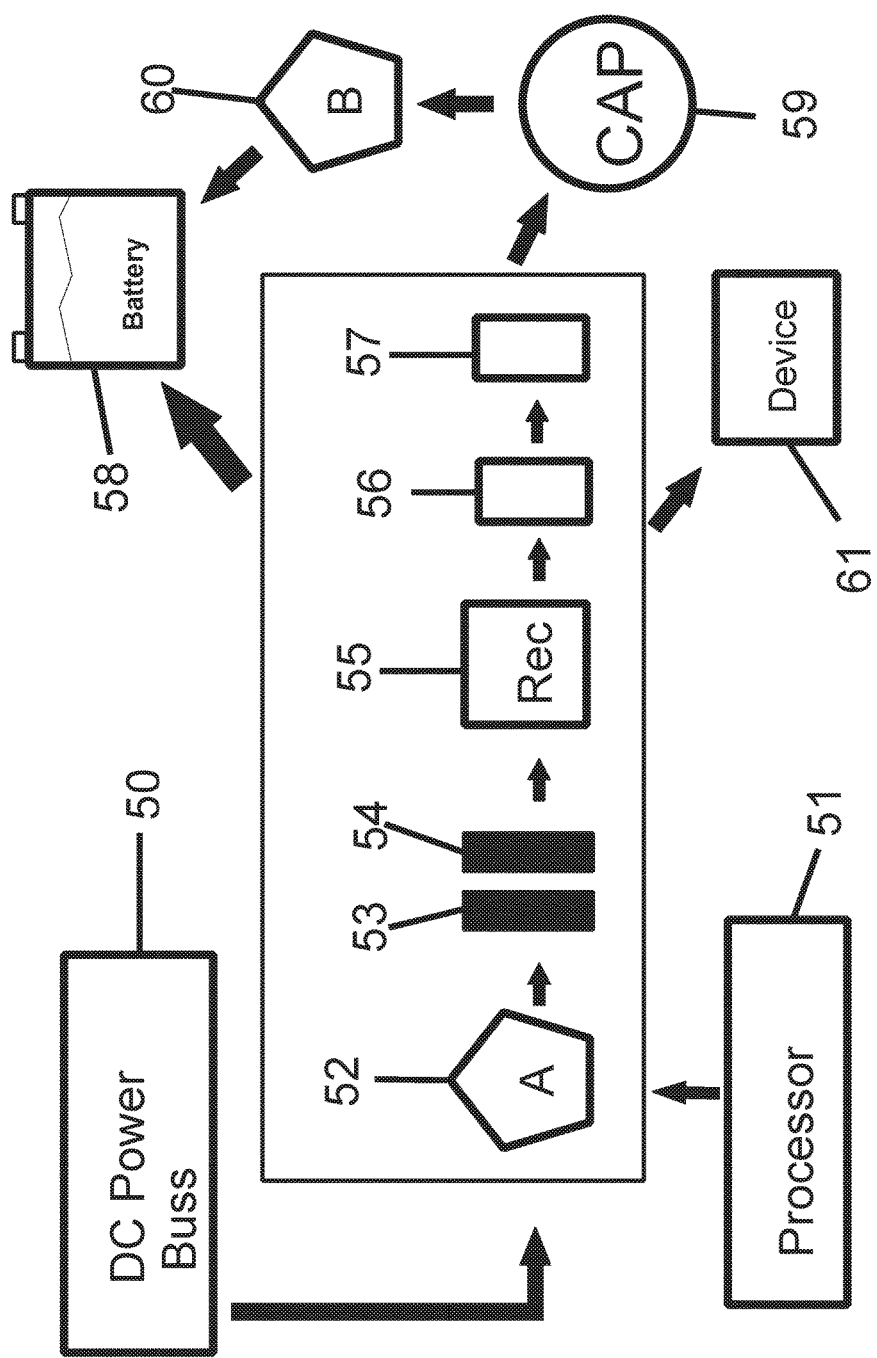
FIG. 2 is a block diagram showing one individual power channel.

FIG. 2 is a block diagram showing one individual power channel. The Power Module consists of more than one phased "N" channel, each channel is comprised of one power conductive pathway in a parallel configuration with other individual phased array power channels. The individual channels sequentially cycle between an "OFF STATE" and an "ON STATE." When a channel is commanded by the processor 51 to be in the "On State," then Channel Switch "A" 52 is closed connecting the DC Power Buss 50 with the flyback transformer primary circuit 53. Energy is stored in the magnetic field of the transformer core. When the energy stored in the flyback transformer is to be released, then processor 51 opens switch 52 disconnecting the Phased Power Channel from the DC Distribution buss. The energy in the flyback core is then transferred to the flyback transformer secondary 54, through the reverse current diode (rectifier) 55, which prevents energy flyback from the battery 58, capacitor 59 or device 61 from entering the transformer secondary. The energy then moves through the current/voltage sensing device 56, through the fuse or protective device 57, and out to either the battery 58 when in charging mode, to the parallel combined capacitor 59 and Battery 58 through the BattRecon Isolation switch "B" 60 when in the BattRecon de-sulfating mode, or to other ancillary external powered devices 61.

Figure 3:
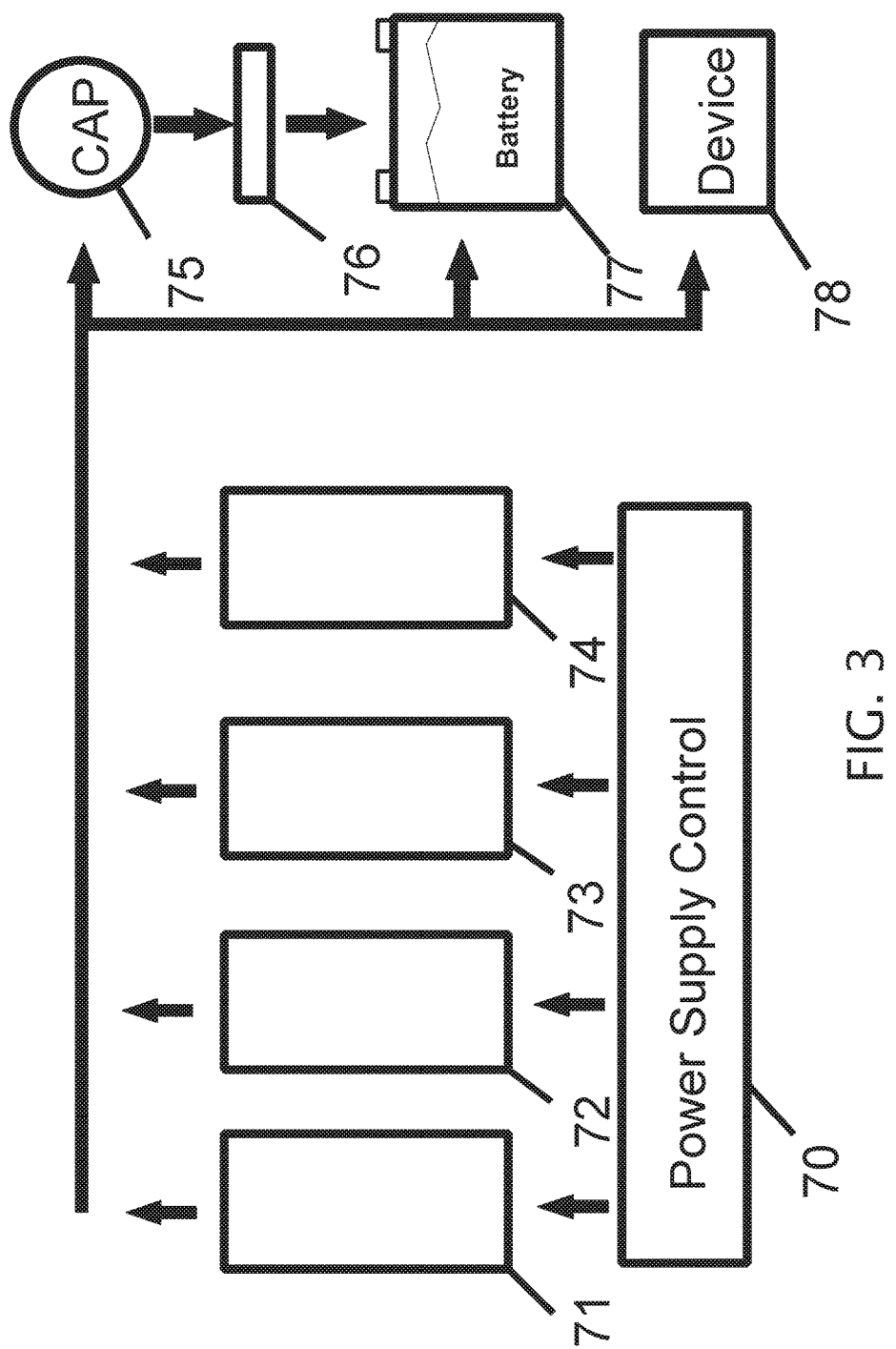
FIG. 3 is an illustration of the Four Channel Power Supply.

FIG. 3 is an illustration of the Four Channel Power Supply. The rectified current is applied to the individual channels and they are then sequentially commanded to cycle from the "OFF STATE" to one "ON STATE," followed by a return to the "OFF STATE." This action would then constitute one complete channel cycle. The Power Supply Control 70 may initially select Channel A 71 and may bi-directionally communicate with Channel A to provide the "On/Off State" commands, or other commands, to the internal switching means within Channel A.

The remaining Power Board Channels "B" 72, "C" 73 and "D" 74, then wait for an "ON State" command from the processor, which determines the channel's individual sequential order within the phased array, the "ON State" frequency, the "ON State" duration and the corresponding "OFF State" duration.

When a channel receives an "ON State" command, it closes the switching device for the channel allowing an energy value to be stored within the transformer core. When a channel's "On State" command is interrupted, then stored energy within the transformer core is discharged to either charge a battery 77 with direct current charge, or charge a storage capacitor 75, or power an external device 78 providing a variable direct current, frequency and phase modified power supply. When the MFPS is used as the power supply for a "dedicated device," such as the BattRecon System, then a switching means 76, operating under a separate logical control means from the processor, or an external control means, will close and open at that separate control means frequency and duration powering the dedicated device.

Once the timing duration of the channel is completed, the processor commands the channel to open its AC Mains conductive pathway, disconnecting the Channel from the DC Power Distribution buss, then discharging the channel energy stored in the inductor into the load. The opening and closing of each channel, plus the isolating features of the channel transformer, provide for electrical isolation of the output from the AC Mains.

Once the initial channel cycle is complete, the processor may measure the effect of the first channel's energy upon the battery or device, and compares that measured affect to the target values. The processor then either 1) increases the channel ON Time duration to increase the desirous output, or 2) reduces the channel ON Time duration to decrease the desirous output, 3) repeats the previous channel ON Time, thus keeping the output the same as the previous channel cycle, or 4) disables the channel entirely. After completion of the prescribed operational cycle, the Power Supply Control returns the Channel A processor to a standby "Off" state, waiting for the next sequential position of Channel A to be "called".

Once Channel A commands are in process, the Power Supply Controller 70 may begin the same process for the operation of Channel B 72, in the same manner as Channel A was previously described.

Once Channel A and B commands are in process, the Power Supply Controller (70) may begin the same process for the operation of Channel C 73, in the same manner as Channel A was previously described.

Once Channel A, B and C commands are in process, the Power Supply Controller 70 may begin the same process for the operation of Channel D 74, in the same manner as Channel A was previously described.

Once Channel A, B, C and D commands are in process, the Power Supply Controller 70 may begin, or may have already begun, or may have already completed, the "reset process" for Channel A 71 within the software sequential cycle. Once the reset is complete, the Power Supply Control will again issue Channel A commands to repeat the sequential A-B-C- and D cycles. This repetition continues during the operation of the power supply.

The process is the same for "N" numbered channels. The "N" may be configured in alternating pairs, so a preferred embodiment may be 2 channels, 4 channels and so on in multiples of two channels per power supply.

The current may be measured at each channel by an IC device mounted on traces of the channel printed circuit board. This current sensing device sends raw data to the processor, which converts it to current values, measuring those values and comparing them to a target output. In the event that one channel should have a current range that exceeds the target value, then the processor will disable the channel output, produce an alarm and adjust the remaining channels accordingly.

When functioning normally, each of the MFPS channels cycle at the same frequency sharing the load equally between all individual channels.

While the power supply is normally controlled by an integral processor and software, it is capable of being remotely controlled and operated. The power supply can be remotely operated by either by a wired or wireless means, those means include WIFI, GPRS or other Cell Tower Network Data means, Infrared, RS 232, a "Cloud" based server, and other bi-directional communication methods. As an example, an internet "Cloud Based Server" could be programmed to located the device using an existing cell tower network, wake up the device, then download and "flash" a new operating system within the power supply processor, re-boot the processor, change the operating parameters of the system, applying the process to the battery, storage capacitor or ancillary device, then send battery metrics data back through the Cell Tower Network to the server, where the power supply metrics are historically stored.

FIGS. 4.1 and 4.2 are illustrations of the switching to AC Mains synchronous sine wave process. When the power supply operates as a "Dedicated Device Powering System" such as in the BattRecon System, it incorporates an additional output switching means separate and distinct from the individual phased array channel(s) switching means, dedicated to the device's specific output algorithms. When using the Measured Channel Control Methodology, the channel comparator "Characterization" cycles continuously conduct battery or load diagnostics using measured battery or load device metrics by the processor, continuously altering each successive phased output switching means to closely match the previous diagnostic value, to a desired target value. The Measured Topology may therefore, be considered to operate in "Continuous Characterization Mode".

As sine wave begins a normal cycle at the Zero Crossing Point (0), the processor signals the output switching means (FIG. 2: Item 60) to close, which supplies an initial low energy flow 31 from the power supply phased array, to the output load. The switching means is then opened interrupting the flow of energy to the device. The processor then measures the effect of the energy flow (FIG. 4.1 item 31) upon the load and compares that affect to the desired target value stored within the processor. The processor then adjusts the subsequent discharge output of the MFPS, by increasing or decreasing the "ON State Duration" (FIG. 4.1 item 32) of the output switching means "closed or conductive state" (FIG. 2: Item 60) to more closely match the desired target value. After several initial "Characterization Cycles," the energy output (FIG. 4.1 item 33) affects upon the battery, or powered device, should closely match the target value. In the event an equilibrium is reached between the "measured and target values," then this equilibrium may be considered the "Continuous Characterization" of the battery. Regardless of whether equilibrium is reached or not, the Measured Control Channel Methodology will repeat the characterization process once during each successive output switching means operational cycle.

The current may be drawn from either the (Positive) sine wave (FIG. 4.1 item 39), or the (Negative) since wave (FIG. 4.1 item 38). The Dedicated Output Switching Means operation may be of a different cycle frequency or duration, from the frequency and duration of the individual, or combined, Phased Power Channels operation.

In FIG. 4.2, when the power supply operates as a "Dedicated Device Powering System" such as in the BattRecon System, it incorporates an additional output switching means separate and distinct from the individual phased array channel(s) switching means, dedicated to the device's specific output algorithms. When using the Time Channel Control Methodology, an initial channel comparator "Characterization" cycle(s) will be conducted applying a diagnostic process upon the battery to determine a "Characterization Value or Time". The diagnostic process measures the effect of the initial energy flow upon the load and compares that affect to the desired target value stored within the processor. The processor then adjusts the subsequent discharge output of the MFPS to the device, by increasing or decreasing the "ON State Duration" of the output switching means, (FIG. 2: Item 60) to more closely match the desired target value. After several initial "Characterization Cycles," the energy outputs (FIG. 4.2 item 34) effect upon the battery, or powered device, should closely match the Target Value.

This diagnostic process results in a "Characterization Value, or Time," which is the "On State" duration of the switching means "closed or conductive state" (FIG. 2: Item 60) from the zero crossing point. This "Characterization Value or Time" is subsequently maintained by the processor, by modulating individual channel "On State Times" based upon a "time from the zero crossing point," to the "desired level of energy point" along the AC Mains. Once the time values from the zero crossing point are determined using battery diagnostic algorithms within the computer, then the sequential "On State" durations are timed, or approximated based upon a time factor, rather than being continuously compared to each previous cycle's diagnostic values. The computer will periodically re-test the characterization, then modify the subsequent timing values accordingly.

As sine wave begins a normal cycle at the Zero Crossing Point (0), the processor signals the output switching means (FIG. 2: Item 60) to close, which begins the "Characterization Cycle" supplying an initial low energy flow (FIG. 4.2 item 31) from the power supply phased array, to the output load. (For simplicity, only two characterization cycles are shown, however, an exemplary Characterization Cycle may have many repetitive cycles to form the Characterization Value.) The switching means is then interrupted allowing the energy to be applied to the load. The processor then measures the effect of the energy flow (FIG. 4.2 item 31) upon the load and compares that affect to the desired target value stored within the processor. The processor then adjusts the subsequent discharge output of the MFPS, by increasing or decreasing the "ON State Duration" of the output switching means, (FIG. 2: Item 60) to more closely match the desired target value.

The second characterization point (FIG. 4.2 item 32) is a result of extending the "On State" duration of the output switching means, which requires that the switching means "On State Time" be increased. The third and final characterization point (FIG. 4.1 item 34), becomes the sequential "On State" timed value for the remaining "On State" switching sequences, prior to another scheduled "Re-Characterization" diagnostic. The MFPS using the Timed Topology, will occasionally conduct "re-characterization" cycles, followed by possible adjustment to the timed interval for subsequent "On State" conditions.

The current may be drawn from either the (Positive) sine wave (FIG. 4.2 item 39), or the (Negative) since wave (FIG. 4.2 item 38). The Dedicated Output Switching Means operation may be of a different cycle frequency than the frequency of the individual, or combined, Phased Power Channels operation.

FIG. 5.1 and FIG. 5.2 are illustrations of the "On State to Off State" timing process. FIG. 5.1 illustrates the timing relationship between the "On State" and the "Off State" during an exemplary Individual Channel 20 microsecond cycle duration. This is not an illustration of the Dedicated Device switching means, rather an illustration of a single phase of a multiphase power supply channel. The cycle begins at the zero crossing point of the AC Mains sine wave 50. The processor will determine an initiation point along the sine wave as the "inception" point 51 of the "On State." This is where the Channel Switching means closes to connect the DC Distribution buss to the transformer primary windings.

The processor's charging sequence frequency then determines at which point along the sine wave the channel switch closes and opens, and all subsequent channels may be operated at the same frequency. Some variants of the control means may adjust the charging sequence frequency to more closely match the load requirements, or as a safety means to protect the load or the MFPS device itself.

Once the "On State" duration is complete, the processor sends a command to revert the switching means to the "Off State" 52, where the switch opens, terminating the cycle charge function, placing the Channel Cycle into the "Off State" portion of the cycle until the maximum cycle duration point 53 is attained. The processor then begins the Channel Cycle over again with an "On State" command 51.

FIG. 5.2 illustrates the relationship between multiple phase, individual channel cycle durations. The first channel in the sequence, Channel "A" begins its inception point at position 55 of the sine wave, drawing energy from the AC Mains through the switching means and to the primary side of the transformer.

Channel "B" begins its inception point at position 56 along the since wave, drawing energy at the same time as Channel "A." Both channels are then simultaneously drawing energy from the AC Mains for their respective transformers.

Channel "C" begins its inception point at position 57 of the sine wave, while Channel "A" and "B" are still drawing energy from the AC Mains. All three channels are then simultaneously drawing energy from the AC Mains.

Channel "D" begins its inception point at position (58) of the sine wave, while Channel "B" and "C" are still drawing energy from the AC Mains. Channel "A" has been commanded by the processor to open its switching means allowing Channel "A" to enter the "Off State." Three channels "B," "C," and "D," however, are simultaneously drawing energy from the AC Mains.

This sequential process continues to rotate between individual channels during the operation of the MFPS.

FIG. 6.1 is an illustration of the Primary and Secondary Flyback energy. This figure illustrates the flyback current waveforms for the primary and secondary sides of each single channel transformer. When the channel switch is closed placing the switch into the "On State," an initial flow of current 60 passes into the primary side of the transformer, while no current is removed from the secondary side 63. The primary side current flow ramps up to the point established by the processor as the termination point 61 for the primary side of the transformer. The primary side current is stored within the transformer core as magnetic energy, which is released into the secondary side at the end of the "On State" cycle. As the primary side current is ramping up, the secondary side remains at the discharged or discharging energy level.

When the channel switch is opened placing the switch into the "Off State Condition," the primary side current flow is interrupted and energy stored within the magnetic core passes into the secondary side of the transformer. The current level at point 62 of the primary side drops to a low condition, while the current level at point 64 on the secondary side goes high. The secondary current flow begins at a high rate, then ramps down to the discharged point 63. This completes one full charge and discharge cycle of a single channel of the power supply.

FIG. 6.2 illustrates the primary side relationships between primary sides of the transformers during sequential operation of four individual channels. Channel "A" 65 begins the ramp up cycle, followed by Channel "B" 66, "C" 67 and "D" 68. The channel "On States" and the point of inception of each Channel with the AC Mains sine wave, is controlled by the processor.

FIGS. 7.1 and 7.2 are illustrations of the superimposed flyback current waveforms. FIG. 7.1 illustrates two individual channels (phases) of primary flyback waveforms. Considering the superimposed magnetic field from primary Channel "A" 72 and primary Channel "B" 73, primary magnetic field "B" is slightly less than ½ of the "peak flux," therefore the "net flux" within the shaped core area is approximately 60% of the Peak Flux. It is known that transformer core loss is proportionate to the flux raised to the 2.86 power (specifically, for Magnetics Inc. "P" material less than or equal to 100 khz, as an example however other materials may be slightly different). The power loss in that volume is about 23% of the normal value. This increase in magnetic efficiency, combined with the increased efficiency of a reduced core volume, provides a savings of over half the normal core loss within the transformer ultimately increasing the efficiency of the power supply.

FIG. 7.2 illustrates four individual channels (phases) of primary flyback waveforms. The current flow varies from zero 70 to the termination point of the "On State" switching means 71. Channel "A" 74 primary charging cycle is followed by Channel "B" 75, which is followed by Channel "C" 78 and Channel "D" 77. Each individual Channel (or Phase) cycle begins and ends at different points along the AC Mains since wave, as would subsequent repetitive phased array cycles.

FIG. 8.1, FIG. 8.2, and FIG. 8.3 are illustrations of the modified Planar E and I constructed Transformer. FIG. 8.1 is an exemplary MFPS, the modified phased array transformer design may consist of a modified "Planar E and I Constructed," stack-up of individual transformer "Channels." The Planar Transformer consists of an "E" and "I" formed plate, and a coil assembly that may consist of: 1) a flat coil winding, 2) a printed circuit board with an etched series of spiral traces, or 3) an equivalent coil assembly design.

An exploded view of a conventional Planar "E and I" design transformer is shown. The "E shaped" plate 80 uses the indentations of the E Shape to allow a core winding 81 to be placed within this shape. The core winding 81 is typically made from a modified printed circuit board, which has the center board area removed to facilitate the positioning of the E shaped center form. The PCB has concentric traces circling the center form of the E shape, replacing the turns of wire commonly used on other types of transformers. An alternate flat coil winding, or other winding design, may also be used as a substitute for the PCB methodology.

FIG. 8.2 illustrates the side view of four adjacently positioned, non-modified planar transformers. Assuming the channels are in phase, Channel "A" 83, Channel "B" 84, Channel "C" 85 and Channel "D" 86 illustrate the identical magnetic flux direction, which may cause interference and resultant inefficiencies within the array. In FIG. 8.3 the modification consists of the initial placement of a contemporarily assembled, Channel "A," consisting of the Channel "A" "I" plate 82 and Channel "A" "E" plate 80. The second channel "B" transformer would consist of the Channel "B," "E" plate 87, followed by the Channel C" transformer consisting of the Channel "C," "E" plate 88, and the Channel "D" transformer consisting of the Channel "D," "E" plate 89.

Each of the Channel "E" plates would have the coil assembly installed within the "E" shaped center body area, prior to the assembly of subsequent "E" plates. As shown in FIG. 8.3, the fluxes are cancelled in three of the five vertical ferrite sections, assuming that all the fluxes are in phase with each other. The cancelling of three of the five vertical fluxes increases the efficiency of the transformer and ultimately, the MFPS as well.

The exemplary assembly process would initially place an unmodified planar transformer Channel "A" 82 and 80, followed by transformer channels "B," 87 and "C," 88 and "D," 89 and subsequent "N" Channels "E" plates, which would be assembled omitting the "I" plate within the latter individual sub-assemblies. Once the "I" plate is omitted from the stack-up of each additional Channel position, subsequent "E" "face" plates would be positioned in close proximity to, or perhaps actually touching, the "back" of the preceding channel "E" plate. The individual coil windings would be installed during the successive stack-up of "E" faces to "E" backs. The primary and secondary coil windings may be of an interleaved configuration, providing very low leakage inductances.

During significant overlap between channels of adjacent transformer sections, the shared core material between them has reduced flux that results in further reduced losses due to the partially in-phase currents that create partially canceling fluxes between the sections. So not only does this cancellation allow for the reduction in the volume of core material, but it further reduces the typically expected core losses in those locations through the reduction in flux.

The MFPS phased array may therefore, consist of a "stacked array" of individual planar transformers, rather than individual, or individually separated planar transformers. While the preferred embodiment may be the "Modified Planar Design," it is understood that alternate transformer designs may be incorporated.

Increased efficiency may result from the "stacked design" resulting from; 1) the reduction of a flux loss/interference between adjacent, non-stacked, individual transformers, and 2) a reduced material volume by the removal of certain individual "I" plates within the modified stack-up.

The "Modified Planar Array," design results in less interference with adjacent "channel" transformers because the modified transformer's flux fields would have to travel through two gaps. The Modified Planar Array results in a reduction of flux densities between adjacent transformers, increasing the core cross sectional area resulting in the reduction of core losses. This decreased flux density cancels the magnetic fluxes, increasing the efficiency of the transformer and power supply. This decreased reluctance prevents significant cross talk between the adjacent transformer coils.

The elimination of core material mass reduces the core losses, therefore, removal of "I" plate segments would lower the mass of the core, reducing the core losses and increasing the efficiency of the transformer and power supply.

FIG. 9 is a data chart example of the "Characterization Diagnostics" process. This figure shows the data example of a "Characterization Diagnostic Cycle" with a 100-amp peak-to-peak target value delivered through the battery, or ancillary device. The data assumes that the internal battery/device resistance remains constant during the application of the peak amperage. The following description refers to a capacitor charge as it is applied to a battery for illustration purpose. It is understood that the device operating as a battery charger, or as a dedicated device power supply, may use a similar characterization process for differing reasons.

The Cycle 1 default initiating 200 milli-amp capacitor charge is applied to the battery resulting in a zero peak Amps indication upon the battery.

During Cycle 2, the processor then apply an additional 200 milliamp default peak value increase to the Cycle 1 initiating value of 200 milliamps, therefore applying 400 milliamps to the battery, again resulting in a zero peak amps indication.

During Cycle 3, the processor may then apply an additional 200 milliamp default peak value increase to the Cycle 2 value, therefore applying 600 milliamps to the battery, again resulting in a zero peak Amps indication.

During Cycle 4, the processor may then apply an additional 200 milliamp default peak value increase to the Cycle 3 value, therefore applying 800 milliamps to the battery, again resulting in a zero peak Amps indication.

During Cycle 5, the processor may then apply an additional 200 milliamp default peak value increase to the Cycle 4 value, therefore applying 1000 milliamps to the battery, resulting in a 30 peak Amps indication.

During Cycle 6, the processor may then apply an additional 200 milliamp default peak value increase to the Cycle 5 value, therefore applying 1200 milliamps to the battery, resulting in a 60-peak Amps indication.

During Cycle 7, the processor may then apply an additional 200 milliamp default peak value increase to the Cycle 6 value, therefore applying 1400 milliamps to the battery, resulting in a 90-peak Amps indication.

During Cycle 8, the processor may then apply an additional 200 milliamp default peak value increase to the Cycle 7 value, therefore applying 1600 milliamps to the battery, resulting in a 120 peak Amps indication, which is beyond the targeted value of 100 Amps peak. During Cycle 9, the processor may then reduce the previous Cycle 8 applied 200 milliamp default peak value increase downwards to a 100 milliamp applied peak value to the Cycle 7 value, therefore applying 1500 milliamps to the battery, resulting in a 110 peak Amps indication, which is beyond the targeted value of 100 Amps peak.

During Cycle 10, the processor may then reduce the previous Cycle 8 applied 100 milliamp default peak value increase downwards to a 50 milliamp applied peak value to the Cycle 7 value, therefore applying 1450 milliamps to the battery, resulting in a 100 peak Amps indication, which equals the targeted value of 100 Amps peak.

During Cycle 11 and Cycle 12, the data table shows that the processor continues to sample the applied peak amps to determine the input values of the capacitor charging cycle.

FIG. 10 is a data chart example of the "Continuous or Re-Characterization Cycle". This figure shows the data example of a "Re-characterization Diagnostic Cycle" that may be required as measured battery or dedicated device metrics are impacted by the MFPS output. As an example, the typical result of charging a battery may be the reduction of the battery's internal resistance. This lowered resistance would alter the measured battery amperage, assuming the same applied voltage from the MFPS. Therefore, to maintain a specific battery metric such as amperage, the MFPS "On State" duration would have to be occasionally modified, or "Re-characterized" when using the Timing Methodology in the Dedicated Device Output Mode. The "Re-Characterization Mode" illustrated in FIG. 9 may be continuously used when operating in the Measured Methodology in a Dedicated Device.

As the data table samples begin, Cycle 1 and 2 show that when the battery has 10 milliohms of resistance, that the applied output current to the battery/device of 1.45 amps at 12.8 VDC, creates a 100 Amp peak-to-peak pulse current within the battery/device.

In Cycle 3, as the internal resistance diminishes to 9 milliohms at the same applied energy level, the voltage rises to 12.9 VDC and the Peak Pulse rises to 110 Amps peak-to-peak. When the processor senses that the peak-to-peak amplitude changes, then the software driven device will make comparative changes to the "On State" duration of either the individual channel outputs, the Dedicated Device switching means, or a combination of both in an attempt to maintain the battery or device metric parameters.

Since the desired peak-to-peak amplitude was set at 100 Amps and the actual peak amps during discharge cycle 3 were 110, then the processor must reduce the MFPS output. The processor will reduce the output current to the battery/device at the default step down value, in this case 200 milliamps, and monitor the change in the peak amplitude during the net sequential cycle.

After the previous Ramp-Down MFPS output correction, Cycle 4 shows that the voltage dropped slightly, while the peak amps decreased to 90 peak. Attempting to maintain the 100-amp peak and considering the unique nature of each battery/device, the processor and operating software must calculate the subsequent cycle 5 applied MFPS output.

The decrease of 200 milliamps from the MFPS output of Cycle 4 resulted in a 20-peak amp decrease, which was below the target value of 100 peak amps. The processor will increase the input current to the battery/dedicated device during Cycle 5 to reach the target value of 100 peak amps. If the Peak change of 20 was caused by a change of 200 milliamps, then every 10 peak change would require a change to the MFPS output current of 100 milliamps. Therefore, a change from 90 the measured peak to the target peak of 100, would require an increase in the MFPS output current of +100 milliamps.

The Cycle 5 MFPS output charge current is therefore 1.25 amps+100 milliamps, or 1.35 amps. As the data table shows, once the Cycle 5 MFPS output charge current was set at 1.35 amps, the resulting battery measured peak amps was 100, which equals the target peak amps.

Cycle 6 shows that there is no MFPS induced impedance variation from Cycle 5.

Cycle 7 shows that there is no MFPS induced impedance variation from Cycle 6, so the capacitor input charge current remains the same.

Cycle 8 shows that there is a MFPS induced variation in the battery/dedicated device's impedance from 9 milliohms to 8 milliohms, requiring another change in the applied MFPS output current.

Cycle 9 shows the reduction of the MFPS output current of 200 milli-amps has been applied to the battery, resulting in a change that is below the target value.

Cycle 10 has another calculated increase in the MFPS output charge current of 100 milliamps, which results in the battery/dedicated device measured peak amps being equal to the target peak amps.

Cycle 11 and 12 show that if there is no preceding cycle change in the battery/device resistance metric, therefore the MFPS output energy may remain the same.

While peak-to-peak measured amplitude was illustrated, it is understood that the same example could be shown with the substitution of measured volts, amps RMS, impedance, electrolyte specific gravity, electrolyte temperature, the measurement of gases such as hydrogen or oxygen, or other metric data references such as time from zero from the AC Mains zero crossing point, as the MFPS output controlling means, with similar changes in the data table numerical values.

It is also disclosed that environmental metrics such as temperature, humidity, or gaseous concentrations, to name a few, may also be used to modify the MFPS output characteristics.

The attached figures illustrate various example embodiments and components thereof, including some optional components. The figures are merely exemplary, and should not be considered limiting in any way. One of skill in the art will understand that the schematically depicted illustrated embodiments may include appropriate circuitry, connectors, communications links, and the like.

While exemplary embodiments have been set forth above for the purpose of disclosure, modifications of the disclosed embodiments as well as other embodiments thereof may occur to those skilled in the art. Accordingly, it is to be understood that the disclosure is not limited to the above precise embodiments and that changes may be made without departing from the scope. Likewise, it is to be understood that it is not necessary to meet any or all of the stated advantages or objects disclosed herein to fall within the scope of the disclosure, since inherent and/or unforeseen advantages may exist even though they may not have been explicitly discussed herein.

Potential Points of Novelty: The following is a non-exclusive list of potential points of novelty:

The MFPS consists of one or more individual power channels consisting of flyback transformer channels.

The MFPS with inherent short circuit protection since the flyback transformer is an energy limited device. The MFPS output energy is not controlled (defined) by the load, rather the output energy is controlled by the timing of the processor.

The MFPS has a wide range of output voltage variability under large current loads to power devices. The MFPS has a wide range of output energy variability under large current loads to power devices.

The MFPS bi-directionally communicates with external devices, such as the BattRecon Branded Digital Specific Gravity Probe. Data such as digitized electrolyte specific gravity, electrolyte temperature, impedance and other battery metrics may be processed and used as modification parameters for control of the MFPS.

In an exemplary MFPS, the plurality of flyback transformers and associated power channels are phased to charge and discharge in a synchronous manner. Power pulses are spread over many "channel phase durations" resulting in a "continuous draw," rather than a single pulse from the AC Mains. The high frequency continuous draw is synchronized to the AC Mains sine wave, resulting in a more efficient power factor corrected conductive means.

In an exemplary MFPS, the MFPS itself, or a dedicated device the MFPS is integral to, may bi-directionally communicate using GSP telemetry and Internet based communication from a fixed IP address, using a computer server means to store and retrieve battery metrics and operational instructions, battery charger metrics and operational instructions, and other dedicated device metrics and instructions, to which the MFPS is integral too.

The MFPS may use external communication devices such as wired or wireless means to bi-directionally transmit battery data, or battery metric data, remote device command and control information, in real time via an Internet based protocol, a cloud based communications protocol, a telemetry based protocol, a Wi-Fi protocol, or other data communication means. While the data formats, algorithms and bi-directional communications means may vary depending on the differing manufacturing recommendations of the external communication devices, the use of battery or battery cell metrics bi-directionally communicated may remain the same or similar amongst differing devices".

The transformer array may consist of individually controlled and switched, sequentially phased, individual "Planar E and I" type transformers featuring a unique "face to back" configuration, and the omission of several "I" plates from the array. This specially configured array positioning of individual planar transformers may reduce flux density and increase transformer performance. As an alternative, individual toroidal transformers, or other transformer types known within the industry, may be substituted.

The phased array transformer design may consist of a modified "Planar E and I Constructed," stack-up of individual transformer "Channels." The Planar Transformer consists of an "E" and "I" formed plate, and a coil assembly that may consist of: 1) a flat coil winding, 2) a printed circuit board with an etched series of spiral traces, or 3) an equivalent coil assembly design.

The elimination of core material mass, referred to as integrated magnetics, reduces the core losses, therefore, removal of "I" plate segments would lower the mass of the core, reducing the core losses and increasing the efficiency of the transformer and power supply.

The MFPS has at least two functional topologies, 1) as a switching AC to DC power supply only, or 2) as a "Power Pack," which combines the AC to DC switching power supply with an additional and separate, energy storage and discharging means.

Regardless of whether a Measured or Timed output topology is used, the power supply's phased, switched array will sequentially connect and disconnect the AC Mains to each individual Phased Flyback Transformer Channel during a sine wave current flow, evenly distributing the average current requirement between the individual transformer channels. The sequential switching means may be a "rotating ring" design circuit, commonly known in the electronics industry, or another sequential switching means, controlled in a constant or variable manner by a computer processor and software. The computer means may also "skip" power sine waves from being coupled to an individual transformer switching channels, depending upon power output requirements. The computer may limit the "On State" to allow more complete discharging during the "Off State".

The MFPS may store and reuse the flyback energy, rather than dissipate it through resistors as heat.

The MFPS provides electrical isolation between the AC mains and the device by the use of the magnetic isolation and sequential timing of the individual channels.

The "Measured" design measures the voltage and/or amperage output effect of the final switched channel upon the battery or powered device, comparing this value to a target value; then adjusting subsequent output values to more closely match the desired value. Once measured and compared, each subsequent switching cycle "On State" duration is lengthened or shortened, to more closely match the targeted value.

The measuring, comparing and modification of the "On State" is continuous for the (each) switching channel, and may be synchronized to each power sine wave. Some variants may "skip" power sine waves to reduce the output of the power supply. Some variants may limit the "On State" to allow more complete discharging during the "Off State." The advantages of the "Measured" over the "Timing" method may be that the "Measured Method" may provide a higher degree of energy output accuracy, and it may provide a higher power output per switching cycle.

The "Timing" methodology uses the "Measured" methodology initially to "Characterize" the load requirements, which determines the repetitive, required cycle voltage and/or amperage output per cycle. Once the load is "Characterized," the "ON State or Charge Time" of that "character" is measured from the "zero crossing point" of the power sine wave, to the "Characterized" voltage/amperage point along the power sine wave. This "On State Charge Time" is then applied to subsequent switching charge cycles, without continually comparing each individual, preceding, voltage or amperage measurement.

Occasionally a "Re-characterization" is performed to check that the desired output matches the measured output. Additionally, the "Timing" process has the flexibility to "skip" power sine wave charging cycles in the event that excess power is being produced. Some variants may modify or limit the "Phased On State" to allow more complete discharging during the "Off State".

The "Re-Characterization" process could also be construed as a "Learning Process," whereby the processor stores previous operational output requirements, correlating those output requirements to a specific battery or dedicated device identification. For example, the "Characterization or Learning Process" could be used as a means to develop an algorithm that may "predict" the battery or dedicated device's remaining life expectancy, or develop an efficiency rating that may be used for determining the serviceability of the battery or dedicated device.

The advantages of the "Timing" compared to the "Measured" method may be that the "Timing Method" may reduce noise or measurement errors within the control system, reduce the AC Power requirements increasing electrical efficiency, reduce heat within the power distribution system, and provide increased reliability of the power output.

The charging condition is referred to as the "On State," while the discharging (or power off) state is referred to as the "Off State." The "On State" is varied in duration by the controlling processor and software, varying the "On State" may automatically vary the "Off State." The "Off State" in some applications may be managed to ensure the discharge state allows the load (consumptive device(s) or storage capacitor) to lower the inductive energy levels within the flyback transformer to prevent magnetic saturation.

The failure to prevent magnetic saturation may result in a "stack-up" condition, which may result in the inductor becoming a "conduction means," which may then over-load the power supply design capabilities. In the event the "Off State" must be managed, this may require the processor and software to reduce the maximum "On State" timing, thereby allocating more of the 20 us time duration to completing a discharge cycle.

The MFPS has an integral Power Factor Correction capability without using a separate correction means.

The MFPS Multiphase Design reduces the input and output voltage and energy ripple.

The "N" phased design provides a scalable energy output, by the increasing or decreasing the number of Phased Array Channels.

The Timing Methodology uses a Characterization and Re-characterization of the current flows, which may be considered a "learning process". Each input power sine wave may have more than one discrete power output channel coupled to it at any given time.

All multi-channel phases would have variable "ON TIME" status, with 360 degree interleaved phasing. The "ON Time," could be controlled by a processor, which measures and compares voltage or current metrics, or by a modification to the channel control timing that would result in variance in the output voltage or energy. The Variable "ON Time" is defined as the amount of time the individual channel switching means, IGBT, transistor, or other switching device, is closed allowing AC Mains current to pass into the channel. The "Off Time" is therefore, that remaining time during the sine wave that the channel current flow is blocked from passing through the switching means, to the individual channel.

The MFPs control means interleaves the individual "N" channels allowing the integration of the multiphase magnetics into one combined and integrated physical structure. This integrated structure reduces the core material requirements and magnetic core loses, resulting in a reduction in electrical ripple, improved power factor, and improved efficiency.

An active snubber circuit that allows otherwise wasted energy to be re-used rather than dissipated as heat.

The MFPS power supply topology may limit the power output into unusual loads, or loads that may suffer a failure, thus preventing damage to the MFPS or the load.

The integrated magnetics structural design reduced the size and weight of the device, when compared to a conventional non-integrated structural design.

While the exemplary device was initially designed as a "Cloud Based" Battery Device Command and Control System ("The Cloud Based System"), it is understood that the disclosed Cloud Based System is not limited to the Battery Device Industry, rather, it may be exemplary in other non-battery industry Device Command and Control applications.

Thus, specific embodiments of a high efficiency, multiphase array flyback battery charger or power supply, with a localized or Internet based bi-directional communication means have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A battery optimization control using a high frequency multiphase flyback power supply with a Localized or Internet Based Bi-Directional Communication comprising:
   a multiphase flyback power supply current source;
   output conductors that is connectable to a battery;
   at least one switching power supply power pack electrically interposing the multiphase flyback power supply current source and the output conductors, each phase including a rectifier electrically connected to the multiphase flyback power supply current source, a capacitor electrically connected to an output of the rectifier, at least one switching device electrically connected to the capacitor, and a diode electrically connected to the output of the switching module;
   a controller that controls a conduction state of the at least one switching device;
   wherein the control is configured to control the conduction states of the at least one switching power supply power pack to provide a current output to the battery;
   wherein the switching device outputs a repeating pattern including an about 0.75 millisecond output followed by an about 9.75 millisecond OFF period.

2. The battery optimization control according to claim 1 wherein said output is a square pulse or a sine wave pulse or a saw tooth pulse or a triangular wave pulse.

3. The battery optimization control according to claim 1 further comprising;
   a peak amperage indicator providing an indication of a peak amperage provided to the battery;
   a Kilo-watt hour indicator providing an indication of the consumed electrical energy restored to the battery from an external charging means, which is passed internally through the battery optimization control device from the external device to the battery;
   a Kilo-watt hour indicator providing an indication of the consumed electrical energy restored to the battery from an internal charging means;
   a Kilo-watt hour indicator providing an indication of the consumed electrical energy restored to the battery from an internal battery optimization means;
   a Kilo-watt hour indicator providing an indication of the consumed electrical energy flowing from the battery to a power consuming means or devices;
   an average amperage indicator providing an indication of a root-mean-square amperage provided to the battery;
   an electrolyte temperature indicator providing a real time indication of the battery electrolyte temperature during charging, the application of internal battery optimization means or discharge testing of the battery;
   a battery qualitative scoring indicator providing a real time indication of the calculated battery quality value derived from the comparison of currently measured battery metrics, to that same battery's historically measured and stored battery metrics, to a database of battery industry qualitative value metrics, or any combination thereof,
   and an impedance indicator providing an indication of the real time impedance of the battery during charging, during a battery optimization means, or during discharge of the battery;
   a specific gravity indicator providing a real time indication of the optically measured battery electrolyte acidity during charging, the application of internal battery optimization means or discharge testing of the battery, and
   wherein the impedance is determined at least in part by ascertaining a difference between the peak amperage provided to the battery and the root-mean-square amperage provided to the battery.

4. The battery optimization control according to claim 1 wherein said battery optimization control device is located between the battery charger and the battery connective means, providing the automated interruption of said means to apply an internal battery de-sulfation process before, during or after the normal battery charging cycle, or any combination thereof.

5. The battery optimization control according to claim 1 that provides at least one of a group consisting of, providing the automated interruption of said means to control the Charge Return Factor of a charger, providing the automated interruption of said means to apply an external device battery de-sulfation process before, during or after the normal battery charging cycle, or any combination thereof and providing the automated interruption of said means to reduce or eliminate a charger Equalization Charge being applied to the battery.

6. The battery optimization control according to claim 1 that is capable of scanning the battery or battery cell metrics of a group consisting of developing device commands based in whole or in part by scanned battery or battery cell metrics, and control internal, devices in the process of optimization of the battery in an automated manner, developing device commands based in whole or in part by scanned battery or battery cell metrics, and control external, devices in the process of optimization of the battery in an automated manner, developing device commands based in whole or in part by scanned battery or battery cell metrics, and control said devices in the process of optimization of the battery in an automated manner for the purpose of controlling a connected battery charger's charge return factor, developing and storing qualitative scoring data to determine the battery's life expectancy and performance characteristics and including optically digitized specific gravity, impedance, volts per cell and electrolyte temperature, battery electrical energy efficiency rations, then developing and storing qualitative scoring data to determine the battery's life expectancy and performance characteristics from such data.

7. The battery optimization control according to claim 1 that includes a Kelvin Connection device that accommodates at least one of a group consisting of the size and shape of an industrial battery cell-to-cell interconnection means, a device that easily penetrates the natural corrosive boundary layer of the interconnection means, a device that is constructed of sharpened contact pointed electrodes manufactured from corrosion resistant material, a device comprised of sharpened contact pointed electrodes that may allow the exposed pointed area to be extended or retracted in a manner to affect the calibration of the measured raw data, a device that is constructed of sharpened contact pointed electrodes spring pressure forced into the subsurface layer of the cell-to-cell interconnection means that may allow the increase or decrease of pressure to affect the calibration of the measured raw data, a connection constructed of sharpened contact pointed electrodes using an outer spring to apply pressure to an inner electrode, were the inner electrode is electrically isolated from the outer spring, a connection device comprised of sharpened contact pointed electrodes that may allow the measured length between the contact tip of the electrode and the attached connective flexible means to be increased or decreased to affect the calibration of the measured raw data, a connection device that easily accommodates the size and shape of certain industrial battery cell terminal posts, a connection device that is immersed within the battery electrolyte using corrosion resistant contact points contacting the electrolyte, a connection device that easily accommodates the size and shape of certain automotive, marine, telecomm or other battery terminal posts, a connection device that easily accommodates the size and shape of certain automotive, marine, telecomm or other battery interconnection means, a connection device that easily penetrates the applied corrosive preventive boundary layer of the interconnection means, a connection device that is constructed of sharpened contact pointed electrodes that are spring pressure forced into the subsurface layer of the cell-to-cell interconnection means of a battery cell array.

8. The battery optimization control according to claim 1 that further includes an electrolyte immersed device that measures at least one of a group consisting of a temperature of the electrolyte by contacting the electrolyte fluid within a battery or battery cell, a device that measures the specific gravity by optical digitization of the physical movement of specific gravity sensitive device, floating past a light bar that provides a light source, a light receiving means and a processing module, comparing that floating specific gravity sensing device light output to the light output of a stationary and identical, non-floating light sensitive device, providing a baseline calibration of the electrolyte turbidity, a device that contains a specific gravity optical digitization processor with an integral temperature sensing device that provides temperature data the processor may use to compensate floatable disk data to temperature compensated disk data, a device that that in conjunction with a terminal or interconnecting means Kelvin connection, measures battery cell impedance between the electrolyte and the negative battery or battery cell terminal, a device that in conjunction with a terminal or interconnecting means Kelvin connection, measures battery cell impedance between the electrolyte and the positive battery or battery cell terminal, a device that measures battery cell impedance between the electrolytes of adjacent batteries or adjacent battery cells, of a series connected array, a device that measures the voltage of the electrolyte by contacting the electrolyte fluid within a battery or battery cell, a device that in conjunction with a terminal or interconnecting means Kelvin connection, measures battery cell voltage between the electrolyte and the negative battery or battery cell terminal, a device that in conjunction with a terminal or interconnecting means Kelvin connection, measures battery cell voltage between the electrolyte and the positive battery or battery cell terminal and a device that the measures battery cell voltage between the electrolytes of adjacent batteries or adjacent battery cells, of a series connected array.

9. The battery optimization control according to claim 1 that further includes a Control Device that uses an integral processor, memory, computer software algorithms and hardware combinations, to apply specific calibration adjustments, schedules and data tables modifying the raw data output of the device sensors, transducers and probes thereby providing a calibration compensation for the specific combination or permutation of the different arrangement possibilities of the stationary and non-stationary transducer elements, and a transducer support means.

10. The battery optimization control according to claim 1 that operates with a group consisting of taking a single battery or battery cell metric reading, or multiple cell metric reading of multiple cells, the quantity of individual readings approaching infinity if desirous, a calibration modification subroutines for cell electrolyte temperature and turbidity, processor temperature, applied probe pressure, ambient temperature, cell metric data averaging or smoothing, or other data calibration requirements, and a collect cell data that includes;
  1) individual cell (battery) voltage;
  2) individual cell (battery) temperature;
  3) individual cell (battery) electrolyte temperature;
  4) individual cell electrolyte level;
  5) individual or comparative cell (battery) impedance as measured from cell post to cell post;
  6) individual or comparative cell (battery) impedance as measured from cell electrolyte to the positive battery post;
  7) cumulative battery or cell array impedance;
  8) individual or comparative cell specific gravity;
  9) individual or comparative battery or cell charging rate;
  10) individual or comparative battery or cell discharging rate;
  11) the individual or comparative peak-to-peak values of applied pulse width modulated signals to the battery or battery cells, either individually or collectively;
  12) the individual or comparative peak-to-peak frequency values of applied pulse width modulated signals to the battery or battery cells, either individually or collectively;
  13) the comparison of peak amperage amplitude vs., average amperage applied to the battery or battery cells, either individually or collectively;
  14) the collection of individual or comparative raw data related to the calculation of a Charge Return Factor;
  15) the individual or comparative raw data relating to the collection of the battery or battery cell electrical efficiency index;
  16) the individual or comparative cell (battery) lifetime cumulative re-charging energy consumed, and
  17) ambient operational temperature, a flexible conductive means from the stationary means to the probes, sensors and transducers utilizing a special wire twist, braided pattern, or shielding process to minimize electrical noise, RMI or RFI interference, a non-flexible conductive means from the probes, sensors and transducers of the device, to the processing unit, to reduce electrical noise, RMI or RFI interference, automatically determine the battery or cell array voltage, capacity or type by the physical configuration, the measured voltage and an RFID identifying chip located on the battery, a device that measures and collects raw individual cell data with a reference to a common ground, within a multi-cell battery array, a device capable of exporting raw or calibrated data in numerous electronic formats, allowing many different types and brands of external instruments or computer based operating systems to access the data, a device incorporating special software algorithms that create a "Virtual Cell Identification Number" for the purpose of applying unique calibration modifications to the raw data of every monitored cell or battery, a device that can calculate the cumulative cell metrics of the entire battery or cell array, a device provides for the electrical isolation of discrete battery or battery cell channels during the data collection process, measuring batteries or battery cells in a random, sequential, or a combined random and sequential monitoring algorithm, during the raw data collection process, a device provides the means to control external ancillary devices such as a charger or load-testing device.

11. The battery optimization control according to claim 1 that creates an applied pulse width modulated signal that can be operated using an integral High Frequency, Isolated, Power Factor Corrected power supply, which can store and release current to the IBO device at least one switching power supply power pack to allow numerous combinations of symmetrical and asymmetrical frequencies, synchronous or asynchronous pulse amplitudes, which in totality may provide for a harmonic affect upon the internal lead plates of the lead-acid battery, wherein the harmonic affect may provide for increased sulfation and an increase in battery performance.

12. The battery optimization control according to claim 1 that creates an applied pulse width modulated signal which can be operated by switching the flow of current from the positively orientated Charging and Industrial Battery Optimization pathways, to a negatively oriented Discharge pathway, through a variable or constant resistive load bank providing a means to discharge a battery for the purpose of testing the battery's discharge capacity and to de-sulfate the battery, the polarity of the current flow through the pulse width modulated device would be reversed from a charging current flow directional pathway, to a discharging current flow directional pathway;

the controlled device's variance of the pulse width modulated ON STATE frequency would correspondingly vary the current average discharged from the battery;

a lengthening of the applied pulse width modulated signal ON STATE frequency results in a higher discharge current flow measured in Amps root mean squared;

a shortening of the applied pulse width modulated signal ON STATE frequency results in a lower discharge current flow measured in Amps root mean squared;

an ON STATE frequency can be varied between 0 and a 100% duty cycle resulting in an average root mean square measured discharge rate between 0 amps RMS and the total capacity of the attached resistive load bank calculated using Ohms' Law;

a discharge rate between 0 and 1000 amps RMS;

the ON and OFF switching of a high current flow through a resistive load bank results in high inductive voltage peak applied to the battery plates, which are limited within the device's hardware and software design to harness the useful applied voltage peak range to de-sulfate the battery, that voltage peak range may vary between types of batteries, an exemplary embodiment would measure and control the applied inductive voltage peaks between 0 and 1000 volts per pulse;

wherein the control means is configured to control the conduction states of the at least one switching power supply power pack module, or an alternating pattern between two or more channels to create an average discharge current output from the battery through a resistive load bank;

wherein the control means is configured to control the conduction states of the at least one switching power supply power pack module, or an alternating pattern between two or more channels to create a discharge OFF State inductive voltage peaks within the battery;

wherein the measurement and control means is configured to control the amplitude of the inductive voltage peaks created during the discharge switching means OFF State, to provide a limited inductive voltage peak within the battery ranging from 0 to 1000 volts, to de-sulfate the battery;

wherein at least one channel of the least one switching power supply power pack module outputs a repeating pattern ranging from an about 0.0 millisecond output followed by an about 100% OFF period, to an about 100% millisecond output followed by an about 0.0 millisecond OFF period, together, or any combination in-between;

wherein the combination of one or more channels of the at least one switching power supply power pack modules outputs a repeating pattern, for the purpose of creating applied voltage and amperage discharge peaks within the battery, de-sulfating the battery as a means to improve the battery's performance, the variance of the pulse width modulated ON STATE current duration would correspondingly create variable peak voltage and amperage currents though the battery;

wherein the combination of one or more channel of the at least one switching power supply power pack modules outputs a repeating pattern, creating symmetrical or asymmetrical with respect to ON and OFF state duration, and synchronous or asynchronous with respect to ON state frequency when using a dual channel PWM discharging system;

wherein the combination of one or more channel of the at least one switching power supply power pack modules, and control means, outputs a repeating discharging pattern, discharging the battery at a rate which would then be measured in terms of minutes of discharge runtime, Amps RMS and KWH of discharge energy removed from the battery, and the volts per cell of an individual battery cell, or multiple individual cells sequentially or comparatively, or the volts per cell average of the combined individual cells constituting a battery; and the specific gravity of the battery cells electrolyte measured individually, sequentially or comparatively, or the average specific gravity of the combined individual cells constituting a battery, or any ratio analysis or qualitative factor resulting from the comparative combination of any of the aforementioned measurements;

wherein the combination of one or more channel of the at least one switching power supply power pack modules, and control means, outputs a repeating discharging pattern, automatically controlling or terminating this discharge pattern once the desirous level of runtime minutes has been attained or exceeded, the desirous level of Amps RMS has been attained or exceeded, the desirous level of KWH has been attained or exceeded, the desirous level of volts per cell of an individual cell, multiple cells sequentially or comparatively measured, or the average cell values of a battery, has been attained or exceeded; the desirous level of the electrolyte specific gravity of the battery cells electrolyte measured individually, sequentially or comparatively, or the average specific gravity of the combined individual cells constituting a battery, has been attained or exceeded, or any ratio analysis or qualitative factor resulting from the comparative combination of any of the aforementioned measurements has been attained or exceeded.

13. The battery optimization control according to claim 12 wherein said bi-directional external communication control means utilizes a processor that adjusts an operational output of the multiphase flyback power supply based upon computer processed metrics provided by probes or sensors, a software algorithm that operates the multiphase flyback power supply at an optimum power factor, and a software algorithm that predicts battery, or device, life expectancy or serviceability.

14. A high frequency multiphase flyback power supply comprising:
 a multiphase flyback power supply current source;
 at least one switching power supply power pack electrically interposing the multiphase flyback power supply current source and the output conductors, each phase including a rectifier electrically connected to the multiphase flyback power supply current source, a capacitor electrically connected to an output of the rectifier, at least one switching device electrically connected to the capacitor, and a diode electrically connected to the output of the switching module;
 a controller that controls a conduction state of the at least one switching device;
 wherein the control is configured to control the conduction states of the at least one switching power supply power pack to provide a current output.

15. The high frequency multiphase flyback power supply according to claim 14 wherein said multiphase flyback power supply current source includes interleaving of multiple channels.

16. The high frequency multiphase flyback power supply according to claim 14 further comprising;
 a peak amperage indicator providing an indication of a peak amperage provided to the battery;
 a Kilo-watt hour indicator providing an indication of the consumed electrical energy restored to the battery from an external charging means, which is passed internally through the battery optimization control device from the external device to the battery;
 a Kilo-watt hour indicator providing an indication of the consumed electrical energy restored to the battery from an internal charging means;
 a Kilo-watt hour indicator providing an indication of the consumed electrical energy restored to the battery from an internal battery optimization means;
 a Kilo-watt hour indicator providing an indication of the consumed electrical energy flowing from the battery to a power consuming means or devices;
 an average amperage indicator providing an indication of a root-mean-square amperage provided to the battery;
 an electrolyte temperature indicator providing a real time indication of the battery electrolyte temperature during charging, the application of internal battery optimization means or discharge testing of the battery;
 a battery qualitative scoring indicator providing a real time indication of the calculated battery quality value derived from the comparison of currently measured battery metrics, to that same battery's historically measured and stored battery metrics, to a database of battery industry qualitative value metrics, or any combination thereof,
 and an impedance indicator providing an indication of the real time impedance of the battery during charging, during a battery optimization means, or during discharge of the battery;
 a specific gravity indicator providing a real time indication of the optically measured battery electrolyte acidity during charging, the application of internal battery optimization means or discharge testing of the battery, and
 wherein the impedance is determined at least in part by ascertaining a difference between the peak amperage provided to the battery and the root-mean-square amperage provided to the battery.

17. The high frequency multiphase flyback power supply according to claim 14 wherein said multiphase flyback power supply current source is scalable by staggering a timing of primitive elements in a sliding timeline.

18. The high frequency multiphase flyback power supply according to claim 14 wherein a period, or duration, of each cycle of a switching frequency is divided by the number of primitive flyback elements.

19. The high frequency multiphase flyback power supply according to claim 14 wherein if a circuit failure is detected within any given primitive element, said faulty element is taken offline, thereby yielding a degradation in power output as said faulty element is individual taken offline.

20. The high frequency multiphase flyback power supply according to claim 14 wherein said power supply is a transformer with an "I" plate and a plurality of consecutive "E" plates, wherein each "E" plate has a separate coil assembly.

* * * * *